United States Patent [19]

Koto

[11] 4,436,439

[45] Mar. 13, 1984

[54] SMALL PRINTER

[75] Inventor: Haruhiko Koto, Shiojiri, Japan

[73] Assignees: Epson Corporation, Nagano; Kabushiki Kaisha Suwa Seikosha, Tokyo, both of Japan

[21] Appl. No.: 296,610

[22] Filed: Aug. 26, 1981

[30] Foreign Application Priority Data

Aug. 27, 1980 [JP] Japan ................................ 55-117890
Aug. 27, 1980 [JP] Japan ................................ 55-117891

[51] Int. Cl.³ ............................................. G01D 15/18

[52] U.S. Cl. .................................... 400/126; 400/320; 400/322; 400/328; 346/140 R; 346/143

[58] Field of Search ............ 346/140 PD, 139 R, 143; 400/126, 124, 306, 320, 322, 328

[56] References Cited

U.S. PATENT DOCUMENTS

| | | | |
|---|---|---|---|
| 3,941,230 | 3/1976 | Bellino et al. | 400/322 |
| 4,053,040 | 10/1977 | McGourty | 400/124 |
| 4,213,714 | 7/1980 | Jones et al. | 400/306 |
| 4,259,026 | 3/1981 | Hanaoha et al. | 400/124 |
| 4,338,035 | 7/1982 | Kondo et al. | 400/320 |

*Primary Examiner*—Joseph W. Hartary
*Assistant Examiner*—Todd E. DeBoer
*Attorney, Agent, or Firm*—Blum, Kaplan, Friedman, Silberman & Beran

[57] ABSTRACT

A small printer for printing characters on a printing medium especially adapted for use in a portable electronic calculator. The printer includes a frame having a carriage slidably mounted thereon for lateral displacement across the printing medium. An ink jet printing mechanism is carried on the carriage for selectively printing characters at predetermined positions along lines of the printing medium. A crank mechanism couples a motor to the carriage so that the printing mechanism can be translated across the printing medium. A printing position control circuit determines when the printing mechanism is in each predetermined printing position and selectively supplies a printing signal to the printing mechanism so that the printing mechanism will print a character at the selected predetermined positions.

66 Claims, 45 Drawing Figures

FIG. 4
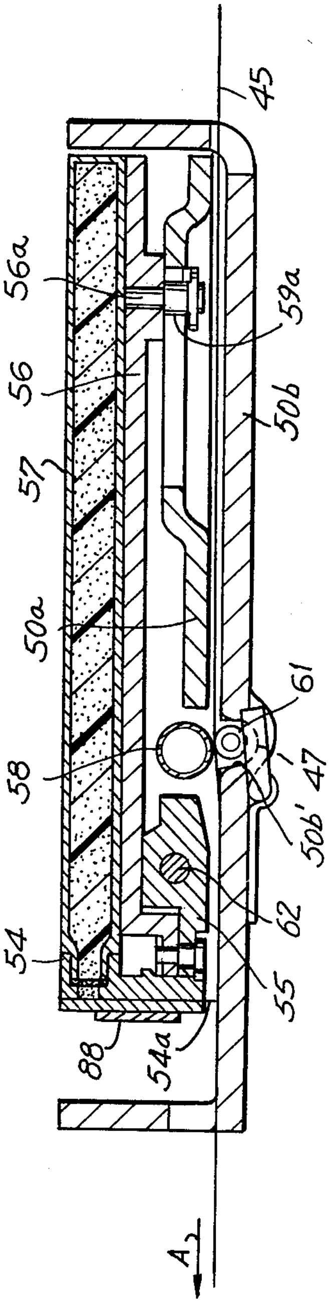
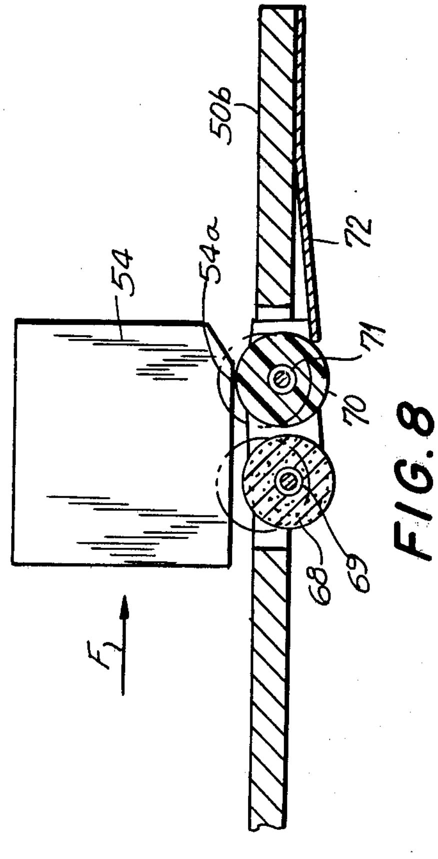
FIG. 8

FIG. 6A
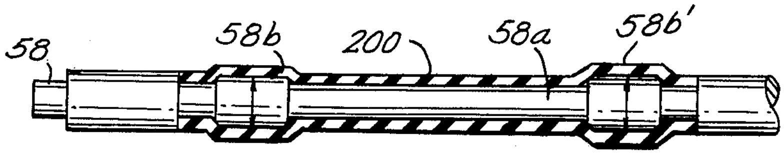
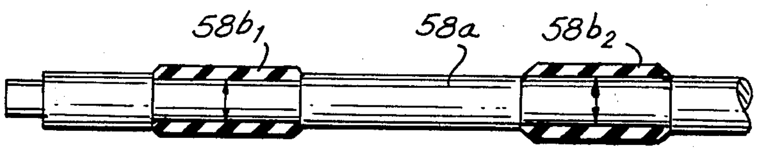
FIG. 6B
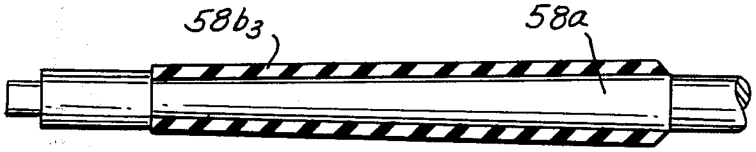
FIG. 6C

PRINTING HEAD POSITION
X
0
0
Ha
360°
ANGLE OF ROTATION OF ROTOR
PRINTING INSTRUCTION
MOTOR ENERGIZING SIGNAL
REVERSE
POSITION DETECTING SIGNAL
REFERENCE TIMING SIGNALS (OUTPUT OF TIMING DETECTOR)
ENLARGED REFERENCE TIMING SIGNALS
TIMING SIGNALS
t0
TIMING SIGNALS REQUIRED FOR PRINTING
T0
T1
T2

FIG. 16
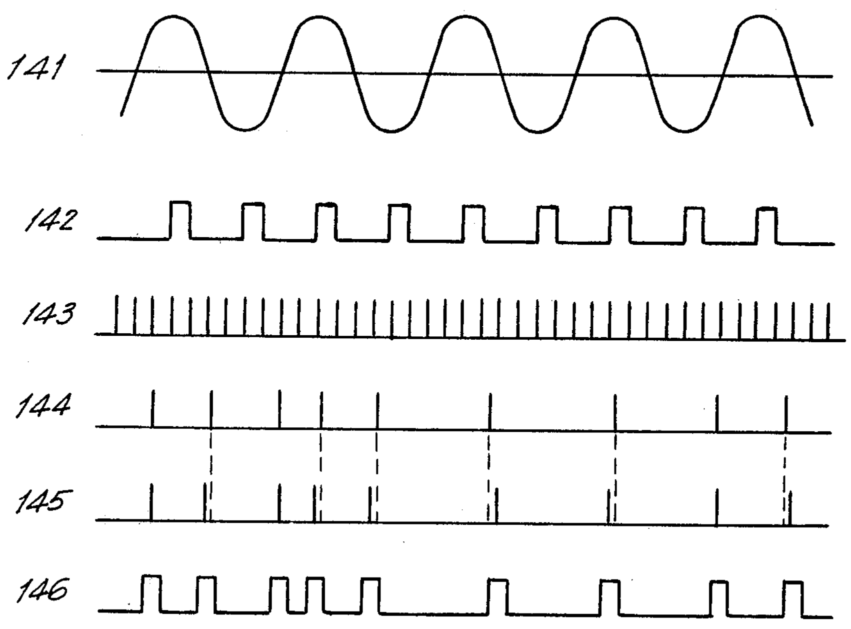
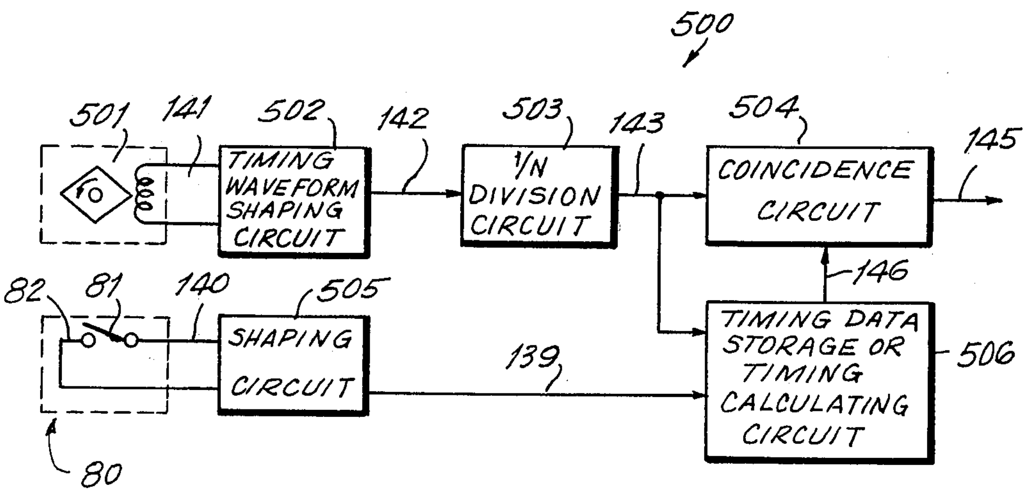
FIG. 17

FIG. 18
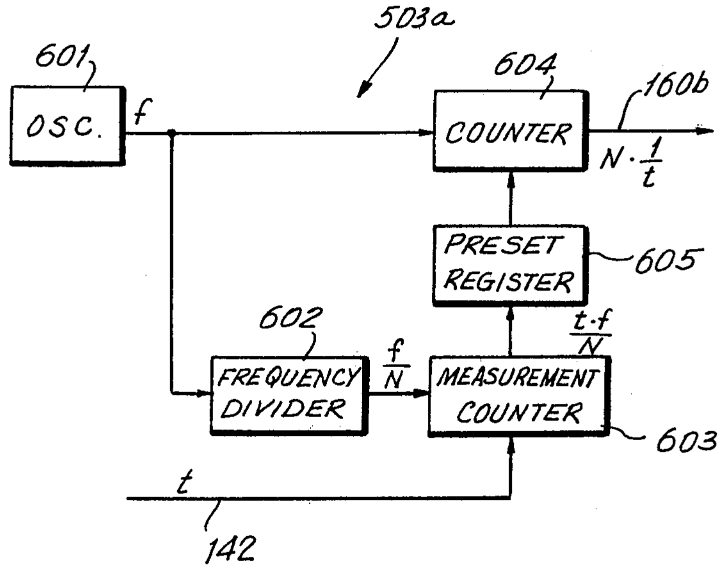
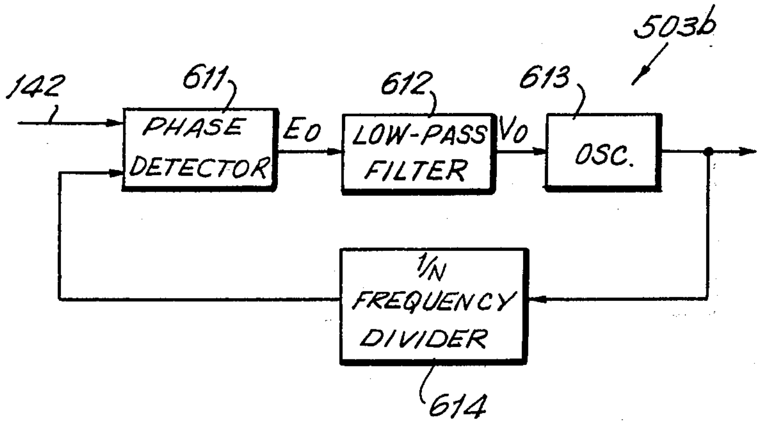
FIG. 19

FIG. 20
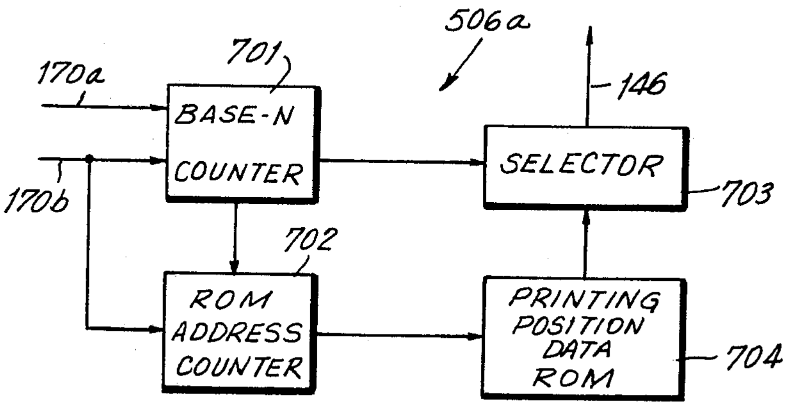
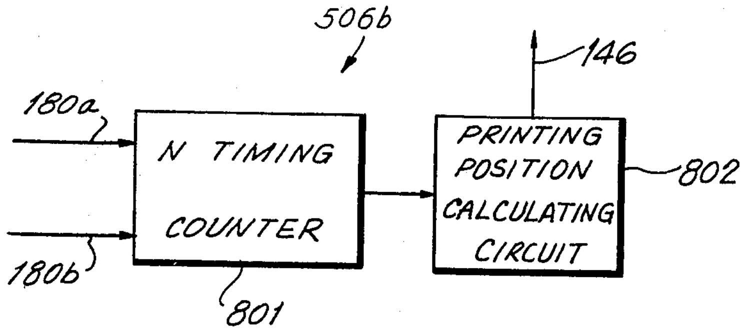
FIG. 21

FIG. 22
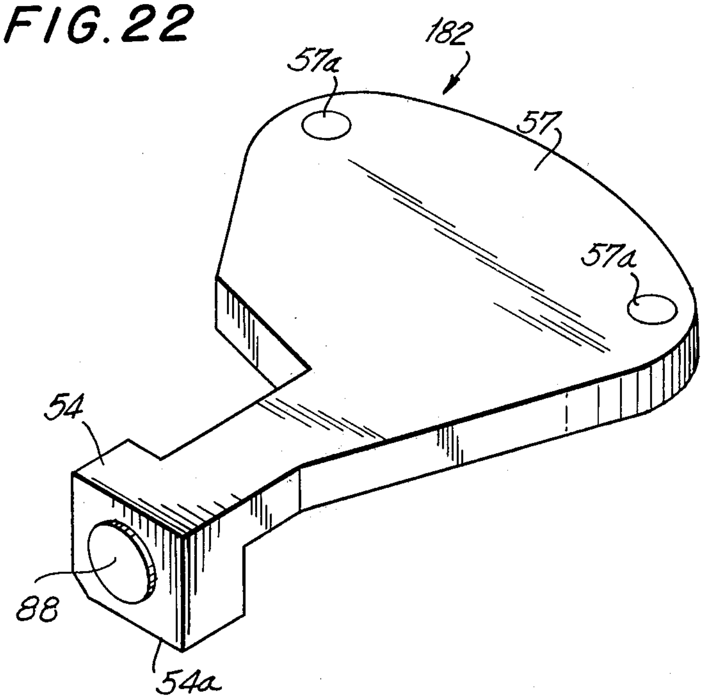
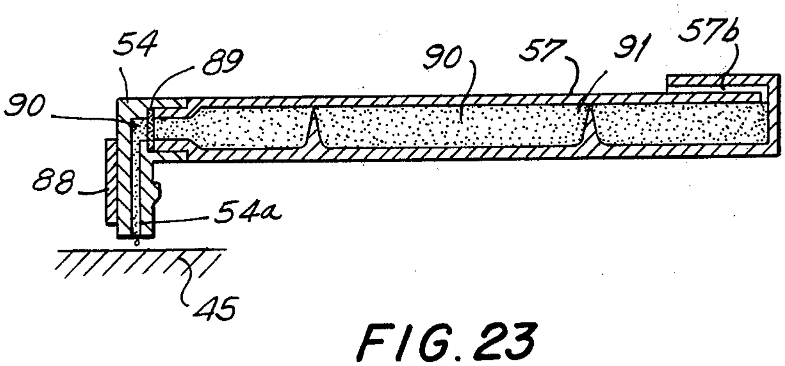
FIG. 23

FIG. 24
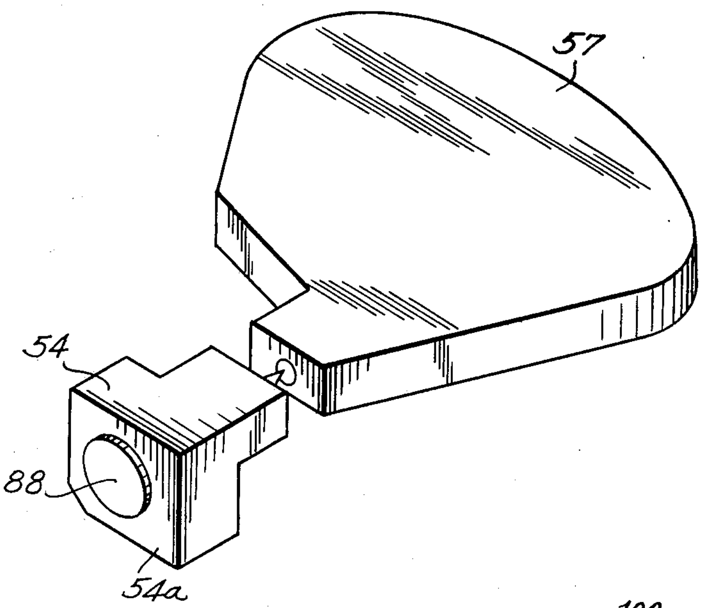
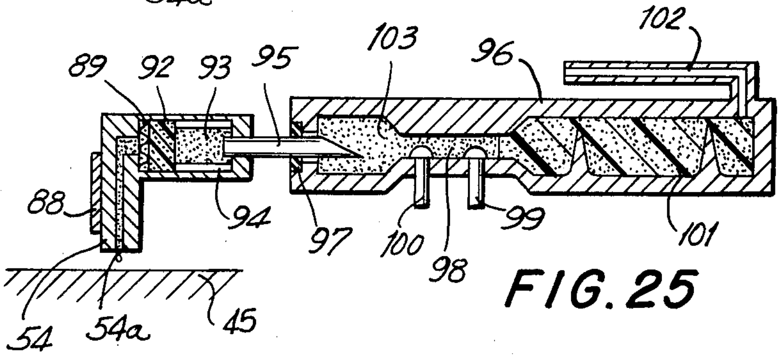
FIG. 25
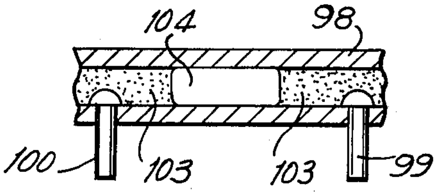
FIG. 26

SMALL PRINTER

BACKGROUND OF THE INVENTION

This invention is directed to a printer and, in particular, to a printer especially adapted for use in portable or hand-held electronic calculators which is low in power consumption, small in size and low in noise.

Recently, a demand has arisen for printers which can be used in small electronic calculators, such as hand-held or pocketable electronic calculators, which can be carried around easily. In addition to providing a display panel in which calculation entries and results can be viewed, it is highly desirable that such calculation entries or results be printed on a printing tape for checking and future reference. However, conventional printers are less than completely satisfactory or impractical since they require too much power to operate. It is essential that the power consumption of such printers be reduced so that the printer can operate on small batteries for a long period of time. In addition, the printing mechanism itself must be extremely small sized for incorporation into a portable calculator and have a low noise level.

A variety of suggestions for reducing the size of a printer for use in a portable electronic calculator have been proposed in the art. For example, in ink jet-type printer as described herein, can be manufactured in a sufficiently small size to be used in portable or hand-held electronic calculators. However, a major concern is to reduce the power consumption of such printers so that they can be operated on small batteries which allow the printer to be incorporated into a portable calculator. Small dry cells are preferably used in portable electronic calculators which can be carried in the pocket. It is preferable that at most four dry cells UM-III (14$\phi\times$50l mm) be used to power the portable calculator. However, it would be preferable if two dry cells UM-III or a button type silver dry cell could be used.

Several types of small printers are presently available for use in portable electronic calculators. However, in a drum type printer in a flying system, the power consumption required for printing one character is about thirty milli-Joules at best. In a mechanical-type dot printer, the power consumed is about sixty milli-Joules per character. In a thermal-type dot printer, about sixty milli-Joules per character is required for printing. Assuming for the moment that the power consumed in printing one character is thirty milli-Joules, the period of time during which a conventional standard printer can run is calculated as follows, provided that there are 15 characters (printing positions) in each line, and the printing speed is about two lines per second. When a single nickel-cadmium charge type dry cell UM-III having a charge capacity of 1900 Joules is used, the period of operating time is:

$$\frac{1900 \text{ Joules}}{30 \text{ mJ} \times 15 \text{ characters} \times 2 \text{ lines/sec}} \approx 2100 \text{ sec} \approx 0.58 \text{ hr.}$$

If four dry cells are used, the period of operating time is substantially increased four times to about 2.3 hours. However, this is a considerably short period of time when compared with the 1000 average hours during which a portable electronic calculator using a liquid crystal display alone can run.

It is known that employment of a piezoelectrically-driven ink-on-demand type ink jet system in a printing mechanism greatly increases the period of time during which the printer can run on given power supply due to the relatively low power consumption thereof. If the printing energy of the ink jet is 0.01 milli-Joule/dot and one character is printed by fourteen dots on the average (where a 5$\times$7 matrix display is employed), then 0.14 milli-Joules is required to print each character. With this data, the following result is obtained using the same formula as above:

$$\frac{1900 \text{ Joules}}{0.14 \text{ mJ} \times 15 \text{ characters} \times 2 \text{ lines/sec}} \approx 450000 \text{ sec} \approx 125 \text{ hrs.}$$

That is, the printer will operate for 125 hours on a single cell if the only power required is to jet the ink. Therefore, if the energy required for operating a printer which translates an ink jet printing mechanism and operates a sheet feeding mechanism can be minimized, then a printer which is lower in power consumption than conventional printers can be realized which can be used in a portable electronic calculator.

The small printers, also referred to as "microprinters", which are presently available on the market consume more than 500 milli-Joules to operate the drive mechanism which moves the printing mechanism across the printing sheet and the sheet feeding mechanism which feeds the printing sheet through the printer. Thus, a small printer which is low in power (energy) consumption has not been provided heretofore.

Moreover, in a battery-driven pocketable electronic calculator having a printer, the printing sheet area in the printer generally occupies a relatively large space and hence the calculator remains bulky. Therefore, it is also desirable that the small printer can use not only a conventional rolled printing tape but also a flat printing sheet (cut sheet) such as a memorandum sheet so that the printer does not require a separate printing tape housing section in order to hold a rolled printing tape.

Where the printer includes a print head on a movable carriage which regularly makes a non-uniform motion with respect to the printing sheet, i.e. the speed of travel is not constant, it is desired to provide a control system for determining the discrete printing positions of the print head so that appropriate printing signals can be supplied thereto for printing in the proper position. In controlling a printer with a carriage which makes a non-uniform motion, it would be desirable to provide a detecting mechanism between the print head carriage and the printer or calculator frame in order to detect in the ratio of 1:1 with respect to the plural printing positions. However, such control is technically difficult if not impossible to achieve where the print head does not have a constant speed. In the case where, as in a dot printer, there are a number of printing positions in a single line, such detection is often impossible and a great deal of energy would be consumed if such a device could be used. Even if such control in the ratio of 1:1 could be achieved, the control mechanism would be very expensive to manufacture.

Accordingly, a small printer especially adapted for use in a portable electronic calculator which is low in power consumption, relatively quiet in operation and which includes a printing position control mechanism, is extremely desired.

SUMMARY OF THE INVENTION

Generally speaking, in accordance with the instant invention, a miniature printer for use in a portable or pocketable electronic calculator or the like which is low in power consumption and operates relatively quietly is provided.

The printer of the present invention is adapted to print characters on a printing medium and includes a frame. A carriage is slidably mounted on the frame for lateral movement across the printing medium. A printing mechanism is carried on the carriage and is adapted to print characters at discrete predetermined positions along lines on the printing medium. A crank mechanism couples a motor to the carriage. The rotary motion of the motor is converted by the crank mechanism into reciprocating displacement of the carriage and hence of the printing mechanism across the printing medium though the predetermined printing positions.

The printer may also include a sheet feeding mechanism for feeding the printing medium past a print head on the printing mechanism so that the print head can print on selected lines of the printing medium. The printing medium can be either a rolled printing tape or a flat printing sheet. The sheet feeding mechanism includes a sheet feeding roller which positively feeds the sheet or tape past the print head.

Since the printing mechanism makes a non-uniform motion across the printing medium, that is, the speed of the reciprocating print head is not uniform, due to the rotary motion of the motor being converted into the reciprocating motion of the print head, a printing position control mechanism is provided in the printer. The printing position control mechanism is adapted to cause the print head to print at the discrete predetermined positions along the printing line. The control mechanism includes a tacho-generator coupled to the motor for producing timing signals and a division circuit for producing a plurality of N timing signals in response to each timing signal. A memory or calculating circuit is programmed with the discrete printing positions of the print head and produces decision signals representative thereof. The N timing signals are matched by a coincidence circuit to the decision signals which produces a printing position signal in response thereto which is selectively applied to the print head for effecting printing at the discrete predetermined printing positions. A detection mechanism detects the starting or reset position of the print head, which signal is applied to the memory or calculating circuit to start the decision signals for each printing line.

The printer preferably uses an ink jet printing mechanism which is piezoelectrically activated by the printing position signals produced by the coincidence circuit. The printer of the present invention is small in size, low in power comsumption and relatively quiet in operation.

Accordingly, it is an object of the instant invention to provide an improved printer for use in portable electronic calculators.

Another object of the instant invention is to provide an improved small printer for a portable electronic calculator which is low in power consumption.

A further object of the instant invention is to provide a small printer which includes an ink jet printing mechanism.

A still further object of the instant invention is to provide a small printer for portable electronic calculators which can print on a flat printing sheet.

Another object of the invention is to provide a printing position control mechanism for use in a small printer which includes a print head which makes a non-uniform motion.

Yet another object of the instant invention is to provide a small printer for use in a portable electronic calculator which can be inexpensively constructed, which is relatively quiet in operation and which can operate for a long period of time on small batteries.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

The printer of the invention is applicable not only to electronic calculators but also to electronic translators or the like equally, therefore, the claims are not limited to electronic calculators.

BRIEF DESCRIPTION OF THE DRAWINGS

For a fuller understanding of the invention, reference is had to the following description taken in connection with the accompanying drawings, in which:

FIG. 4 is a sectional side elevational view of the printer depicted in FIG. 2;

FIGS. 6A, 6B and 6C depict alternative constructions of the sheet feeding roller of the sheet feeding mechanism depicted in FIG. 5;

FIG. 8 is a side elevational view of a nozzle cleaning and cap mechanism for the print head of the printer depicted in FIG. 2;

FIG. 16 is a timing chart depicting various print-related signals produced by the printing control circuit of the present invention;

FIG. 17 is a block circuit diagram of the printing position control circuit constructed in accordance with the present invention;

FIGS. 18 and 19 are alternative embodiments of the timing signal period 1/N division circuit depicted in FIG. 17;

FIG. 20 is a block circuit diagram of the timing data storage circuit depicted in FIG. 17;

FIG. 21 is a block circuit diagram of the timing calculating circuit depicted in FIG. 17;

FIG. 22 is a perspective view of an ink jet print head and ink tank system constructed for use in the printer depicted in FIG. 2 of the present invention;

FIG. 23 is a side sectional schematic view of the ink jet print head and ink tank depicted in FIG. 22;

FIG. 24 is a perspective view of an alternative embodiment of an ink jet print head and ink tank system constructed for use in the printer of the present invention;

FIG. 25 is a side sectional schematic view of an ink jet print head and ink tank having a bubble detecting mechanism for use in the printer of the present invention;

FIG. 26 is an enlarged sectional view of the bubble detecting mechanism depicted in FIG. 25.

DETAILED DESCRIPTION OF THE PREFERRED EMBODIMENTS

Figure 1:
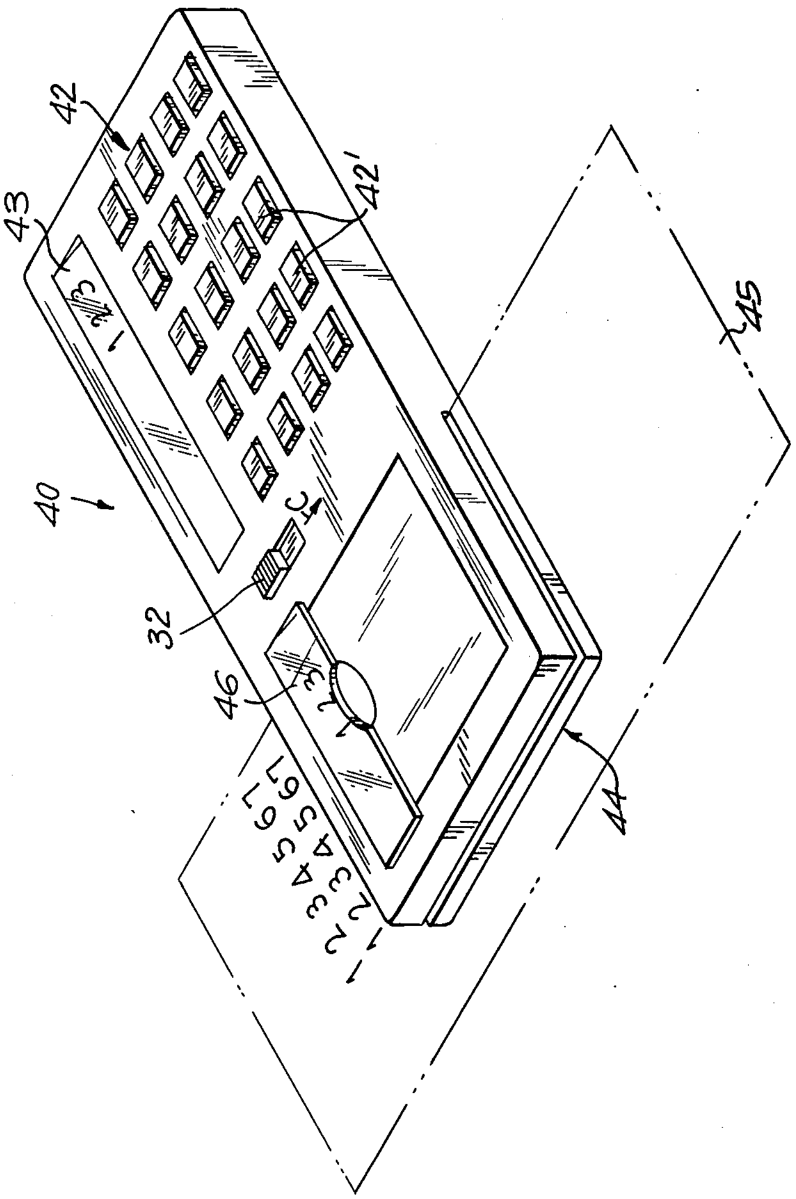
FIG. 1 is a perspective view of a portable electronic calculator having a small printer constructed in accordance with the present invention.

Reference is first made to FIG. 1 wherein a portable electronic calculator, generally indicated at 40, having a printer section, generally indicated at 44, and constructed in accordance with the present invention is depicted. Calculator 40 includes a keyboard 42 having keys 42' for entering characters such as numerals or other mathematical symbols into calculator 40 for processing and a liquid crystal display 43 for displaying the relevant symbols and characters. A printing medium 45 is depicted in FIG. 1 in printer section 44 of calculator 40 on which the numerals or other information can be printed. As depicted, printing medium 45 is a plain flat printing sheet. It is noted however that a regular rolled printing tape can also be used. Printer section 44 also includes a window 46 through which characters being printed on printing sheet 45 can be observed for conformation. A slide button 32 operates a release lever 47 (FIG. 2) to release sheet 45 for manual displacement.

Figure 2:
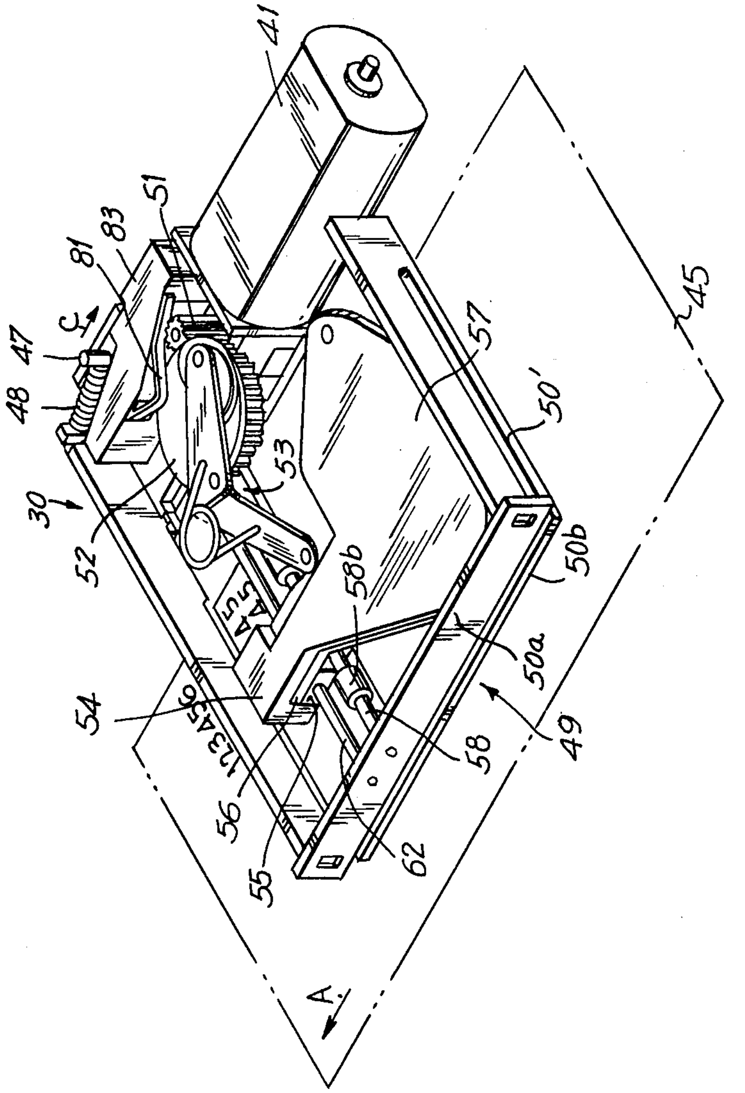
FIG. 2 is a perspective view of a small printer constructed in accordance with the present invention.
Figure 3:
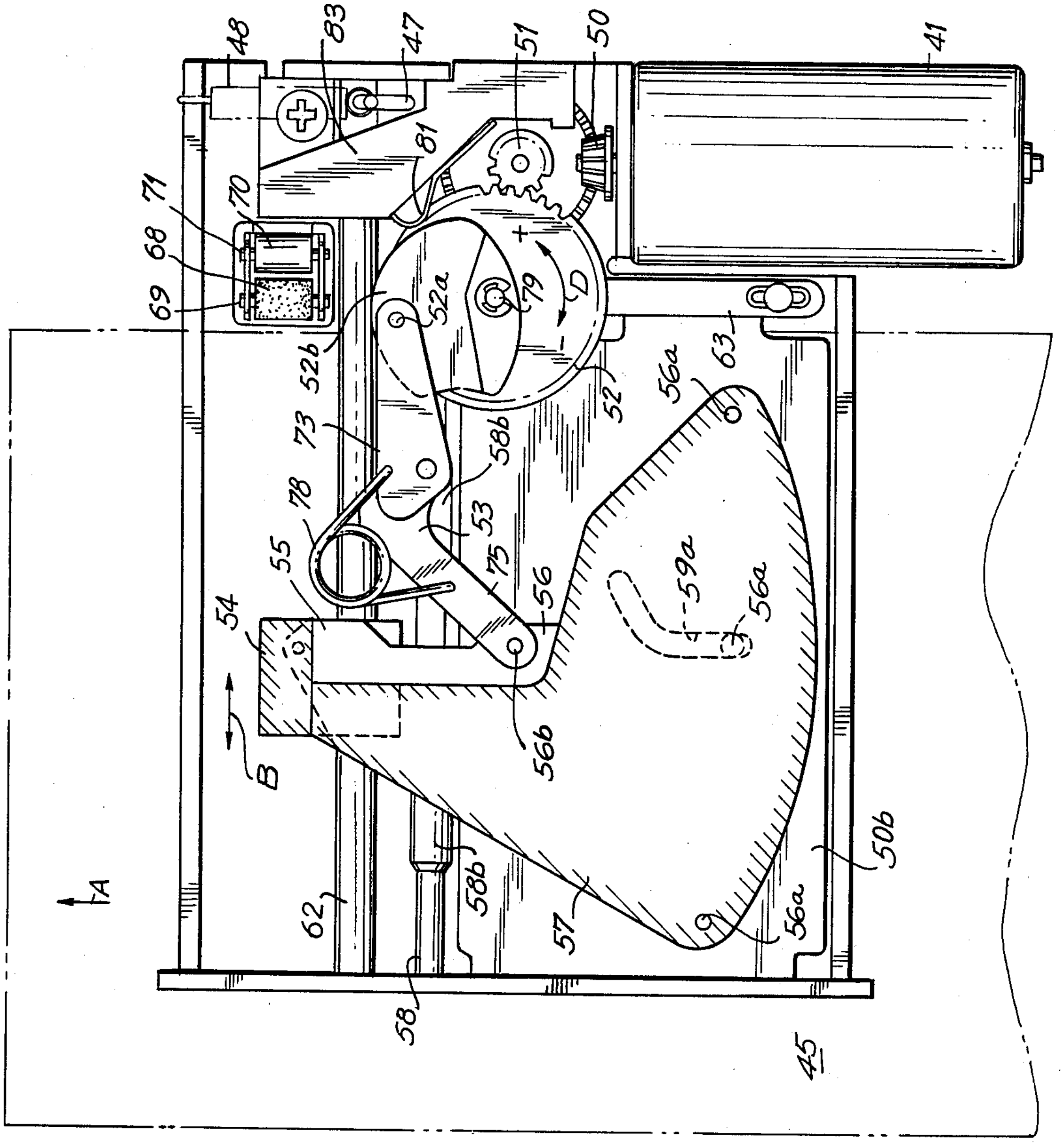
FIG. 3 is a top plan view of the printer depicted in FIG. 2.

Referring now to FIGS. 2, 3 and 4, a small printer, generally indicated as 30, included in printer section 44 in FIG. 1, and constructed in accordance with the present invention will be described. Printer 30 includes a frame 49 having an upper section 50*a* and a lower section 50*b* which together form a cantilever structure so as to define a slot 50' therebetween. Printing sheet 45 travels through slot 50' as more fully described below. The cantilever structure will not exceed its elastic limit even if the width of slot 50' is changed by applying a load to the end thereof.

Printing sheet 45 is fed in the direction of arrow A by being pressed between a sheet feeding roller 58 and a sheet depressing roller 61. Sheet depressing roller 61 presses against sheet feeding roller 58 through printing sheet 45 due to the force exerted by a release spring 48 which is coupled between frame 49 and a release lever 47. The force exerted by sheet depressing roller 61 through sheet 45 to roller 58 is released by moving release lever 47 in the direction of arrow C as a result of which printing sheet 45 is released for manual manipulation.

The printing mechanism of printer 30 includes a print head 54 and an ink tank 57. Print head 54 is reciprocated in the direction of arrow B which is essentially perpendicular to the direction of passage of printing sheet 45 through printer 30 so as to print characters or the like across lines on printing sheet 45. As depicted, print head 54 is an ink-on-demand type ink jet head having a piezoelectric element 88 for activating print head 54 so as to project ink through a nozzle 54*a* as more fully described below. Printing of characters or the like on sheet 45 is carried out by a dot printing method.

Ink tank 57 is coupled to print head 54 in order to supply the ink necessary for printing thereto. Ink tank 57 and print head 54 are mounted on a carriage 56 and therefore move together with carriage 56. Carriage 56 is pivotally coupled at one end thereof to a slide member 55 which is slideably mounted on an elongated shaft 62. Carriage 56 has a downwardly extending pin 56*a* at the other end thereof which extends into an arcuate slot 59*a* in upper section 50*a* of frame 49. Carriage 56 slides back and forth along shaft 62 while slightly pivoting in slot 59*a*. The pivoting of carriage 56 is accomodated by pin 56*a* moving in angled slot 59*a*. Print head 54 is positioned adjacent slide member 55 while ink tank 57 is positioned on top of carriage 56. The printing mechanism including print head 54 and ink tank 57 is in the form of a sector which spreads out from slide member 55 towards pin 56*a*.

Printer 30 includes a motor 41, the rotary motion of which is transmitted by a motor gear 50 coupled thereto to a gear 51 rotatably mounted on frame 49. Gear 51 is meshingly engaged with a crank gear or disk 52 which is rotatably mounted on frame 49. The rotation of crank gear 52 is converted into reciprocation of print head 54 by a transmission mechanism 53 as described in detail below. Transmission mechanism 53 is pivotally coupled to the periphery of crank gear 52 at pivot 52*a* at one end thereof and pivotally coupled to pivot 56*b* on carriage 56 at the other end thereof. Crank gear 52 can rotate in either the (+) or (−) direction as indicated by arrow D.

Figure 5:
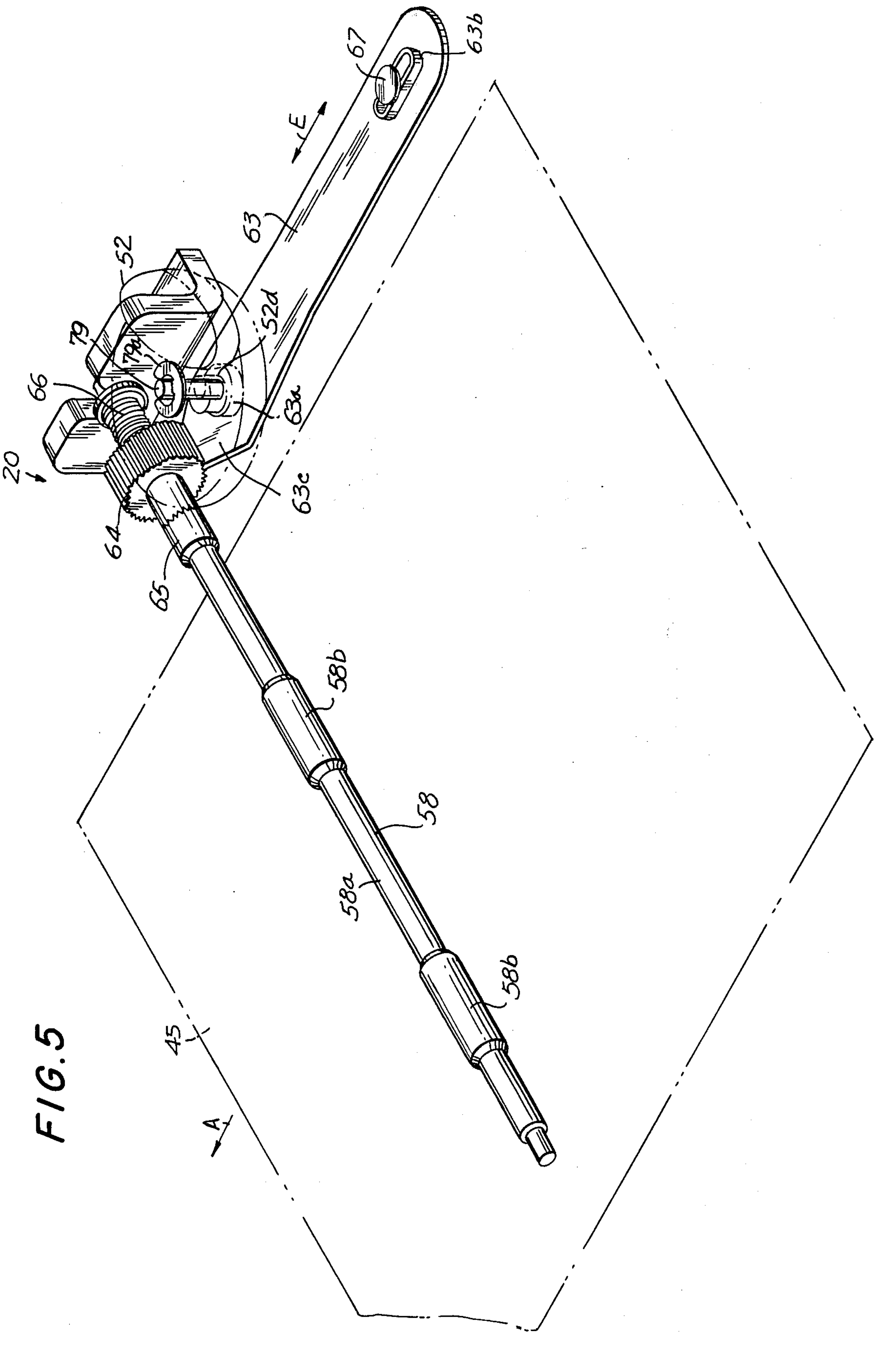
FIG. 5 is a perspective view of the sheet feeding mechanism used in the small printer depicted in FIG. 2.
Figure 7A:
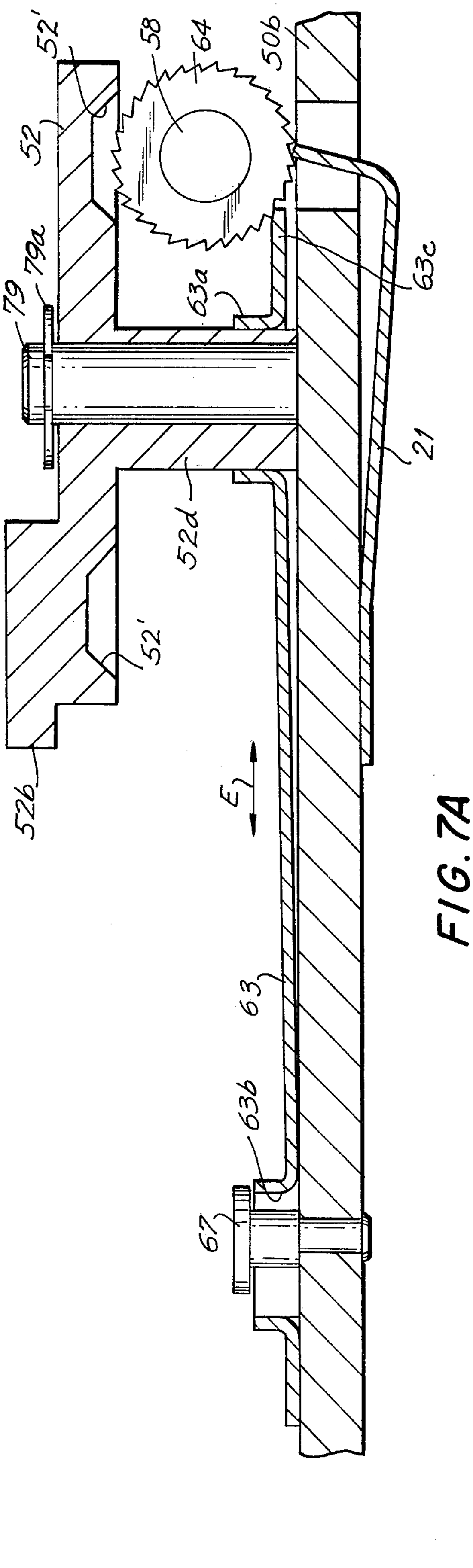
FIGS. 7A and 7B are enlarged sectional side elevational views of the sheet feeding mechanism depicted in FIG. 5.
Figure 7B:
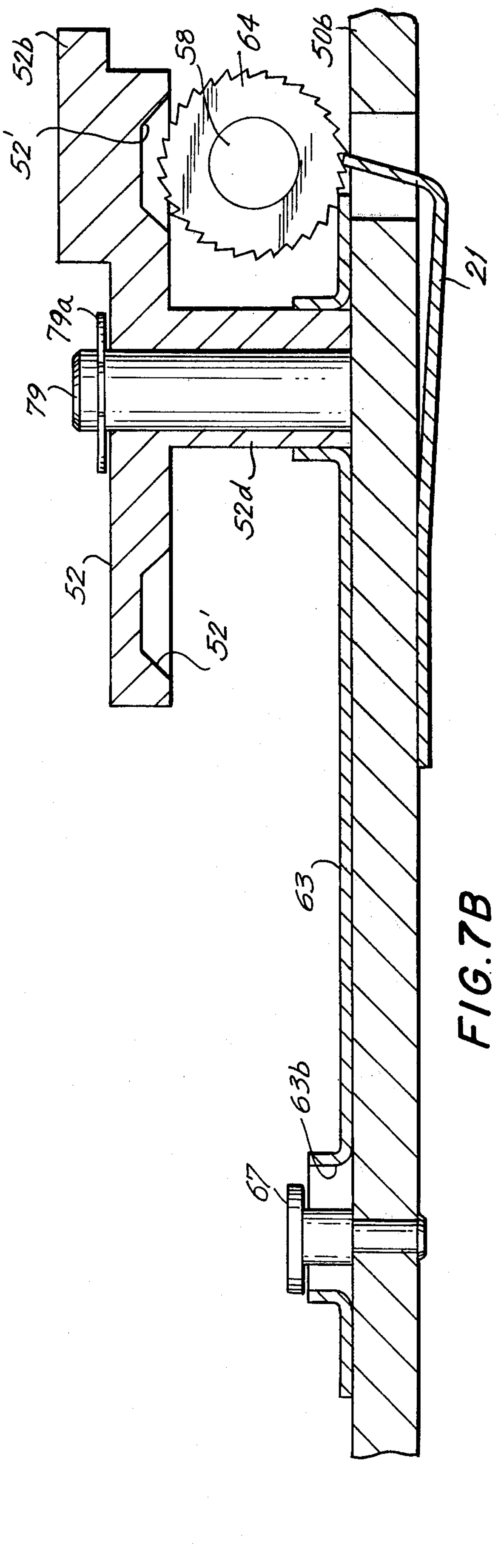

Referring now to FIGS. 5, 7A and 7B, the sheet feeding mechanism of the printer, generally indicated at 20, will be described. Crank gear 52 is rotatably mounted on a pin 79. A cam member 52*d* extends down from crank gear 52 along shaft 79. Crank gear 52 is held on shaft 79 by means of a lock washer 79*a*. A sheet feeding lever 63 is reciprocatingly mounted on frame 49 so as to reciprocate in the direction of arrow E. Lever 63 includes a conforming opening 63*a* which acts as a cam follower through which cam 52*d* passes. A slot 63*b* is formed in the opposite end of lever 63 through which a rivet 67 secured to frame 49 passes. As crank gear 52 is rotated, sheet feeding lever 63 will reciprocate in the direction of arrow E. Sheet feeding roller 58 includes a ratchet 64 which is in engagement with a pawl 63*c* on lever 63. Each time lever 63 is reciprocated, ratchet 64 will be rotated by one tooth position thereby rotating sheet feeding roller 58. Rachet 64 is engaged with a transmission gear 65 on sheet feeding roller 58 to rotate same. A spring 66 provides the tension in ratchet 64 for proper engagement with pawl 63c and gear 65. Sheet 45 is fed through the printer by the rotation of sheet feeding roller 58 while being pressed between sheet feeding roller 58 and sheet depressing roller 61. It is noted that an annular groove 52' is formed on the underside of crank gear 52 to permit the free rotation of ratchet 64 thereunder. A leaf spring 21 is biasingly engaged with ratchet 64 in order to hold ratchet 64 each time it is advanced by the reciprocation of lever 63.

When it is desired to manually move printing sheet 45, even when ratchet 64 is engaged with sheet feeding lever 63, the engagement of ratchet 64 and gear 65 is released by sliding roller 58 against the elastic force of spring 66. In this manner, sheet feeding roller 58 can be manually rotated by pulling sheet 45. It is noted that sheet depressing roller 61 is held in a recess 50b' (FIG. 4) in lower section 50b of frame 49 and is pressed against sheet feeding roller 58 by release lever 47 and spring 48.

Sheet feeding roller 58 includes a shaft 58a having rollers 58b thereon. Referring to FIGS. 6A through 6C, alternative constructions of sheet feeding roller 58 will be described. As depicted in FIG. 6A, sheet feeding roller 58 includes a shaft 58a having two rollers 58b and 58b' formed thereon. The width of roller 58b' is slightly greater than the width of roller 58b. A rubber cover 200 is secured over shaft 58a and rollers 58b and 58b'. Accordingly, the amount of feed of the right side of printing sheet 45 is different from that to the left side so that the printing sheet is fed while being shifted towards one side. However, since one edge of print sheet 45 is guided by upper section 50a or lower section 50b of frame 49, printing sheet 45 will be positively fed without being misguided.

In the sheet feeding roller depicted in FIG. 6B, two rubber rollers $58b_1$ and $58b_2$ are utilized. The diameters of rollers $58b_1$ and $58b_2$ are slightly different from each other and the outside diameters of the two rubber rollers are different. Thus, as described with reference to FIG. 6A, the printing sheet will be positively fed.

In FIG. 6C, roller 58 includes a tapered shaft 58a on which a rubber roller $58b_3$ is placed. Accordingly, the outside diameter of rubber roller $58b_3$ is decreased gradually toward one end. Thus, the printing sheet 45 will be positively fed through the printer as described above.

Sheet feeding lever 63 is preferably made of an electic material. Sheet feeding lever 63 is shaped so that it is engaged with ratchet 64 while being pressed thereby. Thus, sheet feeding lever 63 reciprocates while being positively engaged with ratchet 64. Opening 63a and slot 63b in sheet feeding lever 63 are made by a knock out process whereby frictional wear resulting from contact between opening 63a and cam portion 52d of disk 52 and between slot 63b and guide pin or rivet 67 is minimized.

Figure 9:
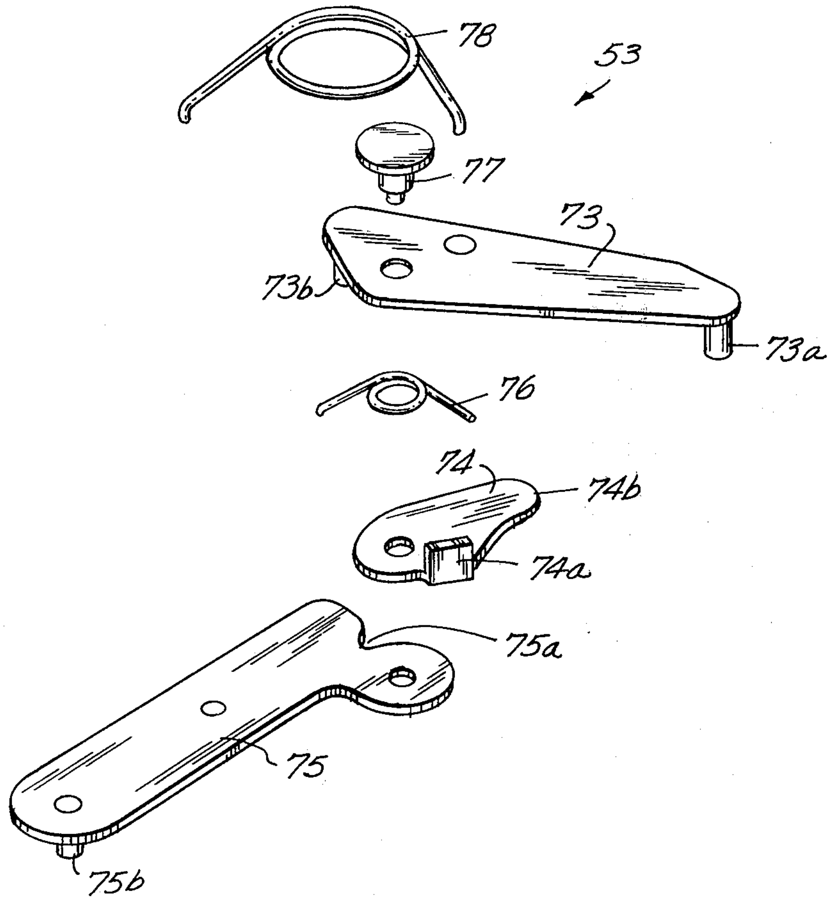
FIG. 9 is an exploded perspective view of the transmission mechanism of the printer of the present invention depicted in FIG. 2.

In the printer of the present invention, an ink jet type printing mechanism is utilized. Thus, print head 54 is an ink jet print head which is piezoelectrically actuated by a piezo-electric element 88 which forces ink droplets out of nozzle 54a. Therefore, it is necessary to protect the ink in nozzle 54a in ink jet print head 54 from drying out when the printer is not being used. Referring now to FIGS. 8, 9 and 10, the construction and operation of a mechanism for protecting the ink in nozzle 54a from drying out, will be described.

As depicted in FIGS. 3 and 8, printer 30 includes a cylindrical cleaner 68 and a cylindrical nozzle cap 70 which are rotatably mounted on shafts 69 and 71, respectively. Shafts 69 and 70 are pivotally mounted on an elastic member 72 which is secured to lower frame 50b. When printing head 54 is moved in the direction of arrow F, as explained below, nozzle 54a will press against cleaner 68 which removes dust or other foreign matter therefrom. As print head 54 continues moving in the direction of arrow F, print head 54 will depress cleaner 68 against the elastic force of elastic member 72 and will come to rest so that nozzle 54a is seated on cylindrical nozzle cap 70. Nozzle cap 70 is held in contact with nozzle 54a of print head 54 by the elastic force of member 72. Cylindrical nozzle cap 70 acts as a cover for nozzle 54a which seals nozzle 54a and prevents air from drying out or evaporating ink in nozzle 54a. Cleaner 68 is preferably constructed from a porous material having minute, continuous pores. Nozzle cap 70 is preferably formed from rubber or other soft plastic material.

Reference is now made to FIG. 9 which depicts the construction of transmission mechanism 53. Transmission mechanism 53 includes a first transmission lever 73 having pins 73a and 73b extending downwardly on opposite ends thereof. Pin 73a is pivotally engaged in a recess 52a in crank gear 52 (FIG. 3). Pin 73b is normally engaged in a cut 75a in a second transmission lever 75. A lock lever 74 and a spring 76 are disposed between first transmission lever 73 and second transmission lever 75. Levers 73, 74 and 75 are rotatably mounted on a shaft 77. The elastic force of spring 76 is applied to lock lever 74 so that upstanding tab 74a on lever 74 abuts lightly against first transmission lever 73. A second spring 78 is coupled intermediate first lever 73 and second lever 75 so that pin 73b normally abuts against cut 75a. A pin 75b on second transmission lever 75 is pivotally engaged in an opening 56b in carriage 56 (FIG. 3). Thus, transmission mechanism 53 couples crank gear 52 to carriage 56 such that the rotary motion of crank gear 72 is converted into reciprocation of carriage 56 and hence print head 54 secured thereto. During normal printing operations, transmission mechanism 53 acts as a rigid lever between crank gear 52 and carriage 56. However, as described below, transmission mechanism 53 will fold in order to position print head 54 over nozzle cap 70.

Figure 10B:
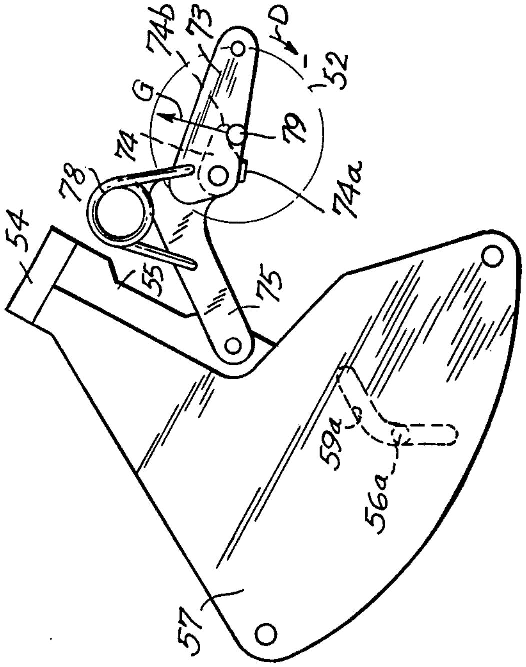
FIGS. 10A, 10B, 10C and 10D are top plan views of the printer drive system including the transmission mechanism depicted in FIG. 9, shown in operation.
Figure 10C:
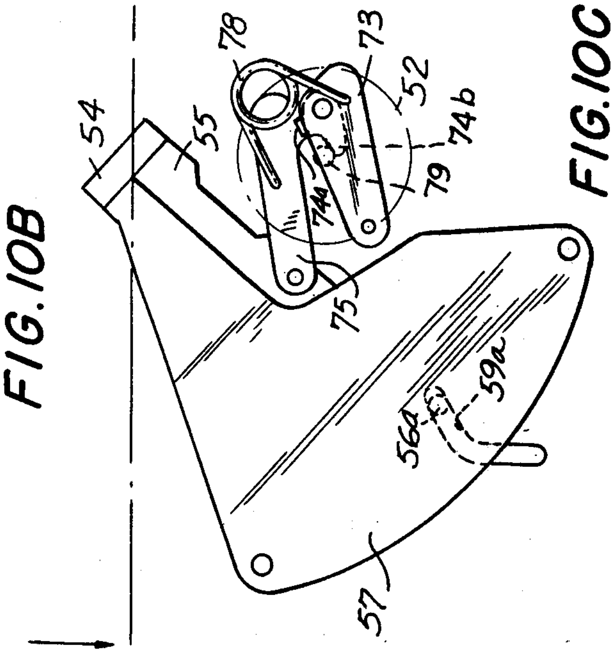
Figure 10A:
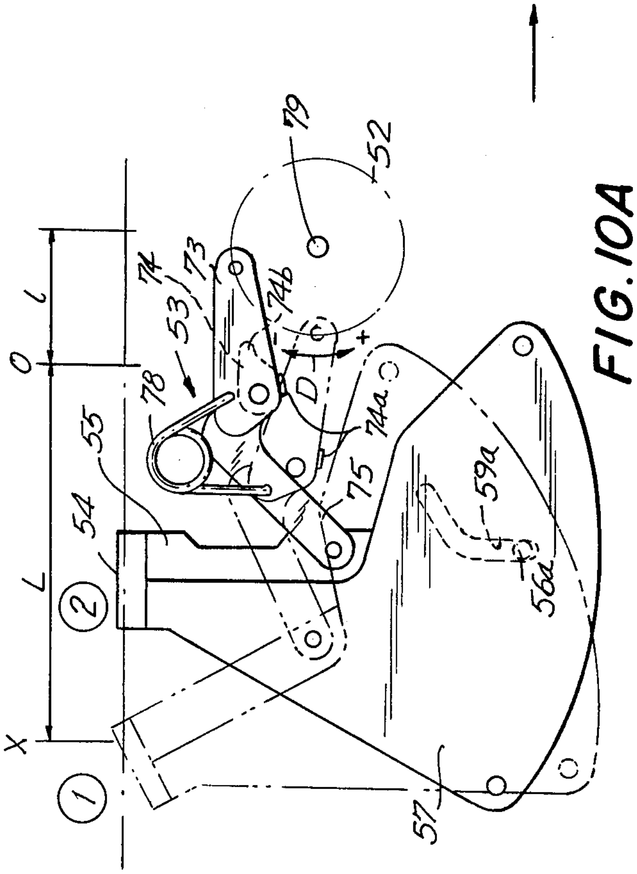

Referring to FIGS. 10A, 10B, 10C and 10D, the operation of transmission mechanism 53 will be described. In FIG. 10A, the distance of movement of print head 54 during the normal printing operation which is between point X and point O is indicated by L and the distance of movement between the normal printing position point O and the position where print head 54 is over nozzle cap 70 is indicated by l. During the normal printing operation, crank gear 52 rotates in the (+) direction of arrow D and print head 54 reciprocates along distance L between point X and point O. upon completion of the printing operation, print head 54 is stopped at position ① and held there. When an instruction is issued to position nozzle 54a over nozzle cap 70, motor 41 is rotated in the opposite direction, and therefore crank gear 52 is rotated in the (−) direction of arrow D. The positioning of print head 54 at position ① is depicted in phantom in FIG. 10A. As depicted in FIG. 10A, crank gear 52 has started to rotate in the (−) direction of arrow D so that print head 54 is in position ②.

As crank gear 52 continues rotating in the (−) as depicted in FIG. 10B, portion 74b of lock lever 74 presses against shaft 79. A force is imparted to lock lever 74 in the direction of arrow G so that as crank gear 52 continues rotating in the (−) direction, transmission mechanism 53 folds around shaft 79 as depicted in FIG. 10C. In FIG. 10C, print head 54 has moved the distance l such that nozzle 54a of print head 54 is positioned over nozzle cap 70. In this case, spring 78 serves as a bi-stable spring, so that the positional relationship between first transmission lever 73 and second transmission lever 75 is held in its folded position as depicted in FIG. 10C.

Figure 10D:
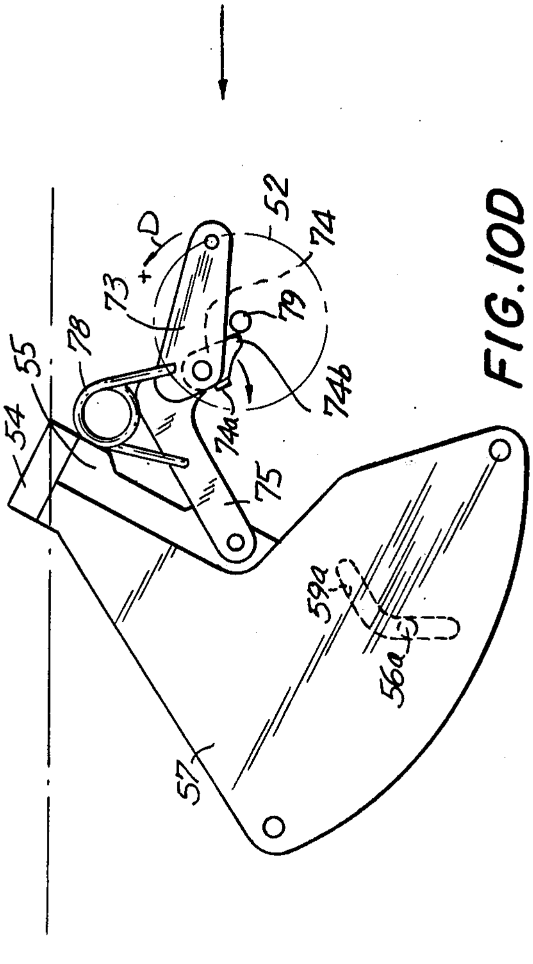

When a new printing instruction is issued, motor 49 is rotated in the forward direction and therefore crank gear 52 is rotated in the (+) direction of arrow D as depicted in FIG. 10D. Transmission mechanism 53 will return to its original extended orientation as depicted in FIG. 10A so that print head 54 can be reciprocated along the distance L between points X and O for normal printing on printing sheet 45. Tab 74b on lock lever 74, during the rotation of disk 52 will contact shaft 79. However, it will not lock against shaft 79 since lock lever 74 moves away therefrom while rotating. Thus, transmission mechanism 53 acts as rigid lever for converting the rotary motion of crank gear 52 to the reciprocating motion of carriage 56 and hence print head 54 when rotating in the (+) direction and folds essentially in half after rotary in the (−) direction in order to position print head 54 over nozzle cap 70 when not printing.

Figure 11:
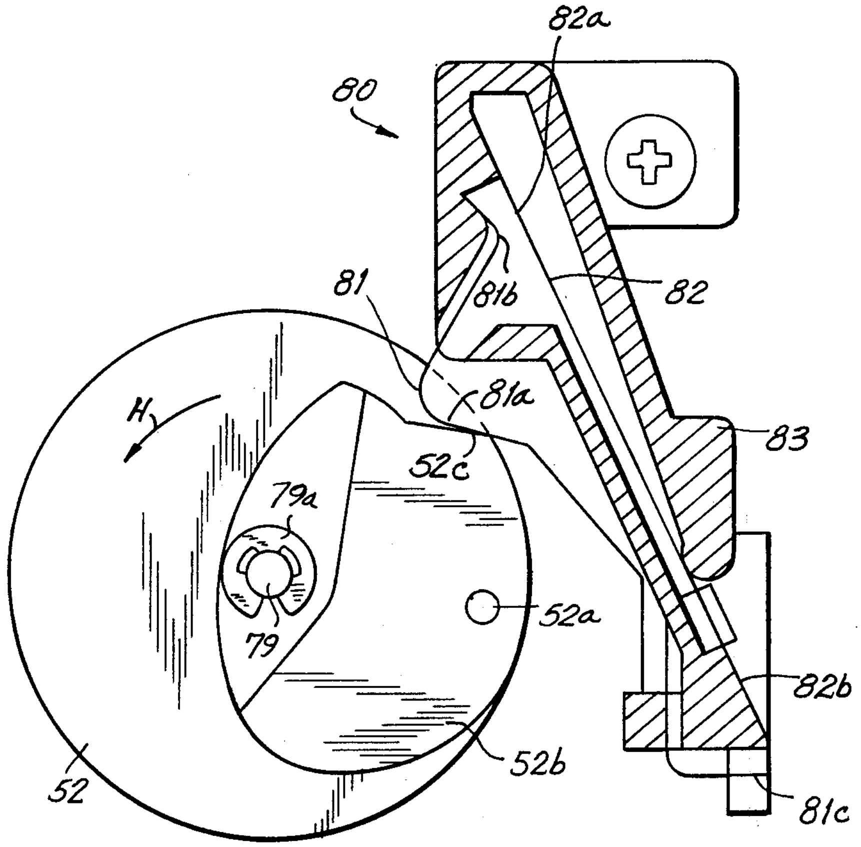
FIG. 11 is a top plan view of the position detecting mechanism of the printer depicted in FIG. 2.

Referring now to FIG. 11, it is noted that crank gear 52 includes a second cam 52b as best viewed in FIGS. 7A and 7B. Cam 52b operates a position detecting mechanism generally indicated at 80. During each rotation in the direction of arrow H, caming surface 52c of cam 52b will depress a portion 81a of a contact spring 81. As a result, when contact spring 81 is depressed, contact 81b thereon will press against portion 82a of a second contact spring 82. Since a voltage is applied across terminal 81c of first contact spring 81 and terminal 82b of second contact spring 82, a circuit will be completed and current will flow therebetween. As described below, this curent signal is utilized as a start position or reset signal. Contact 81b of first contact spring 81 and contact 82a of second contact spring 81 and contact 82a of second contact spring 82 are placed in a case 83 so that dust or the like will not affect the operation thereof.

Figure 12:
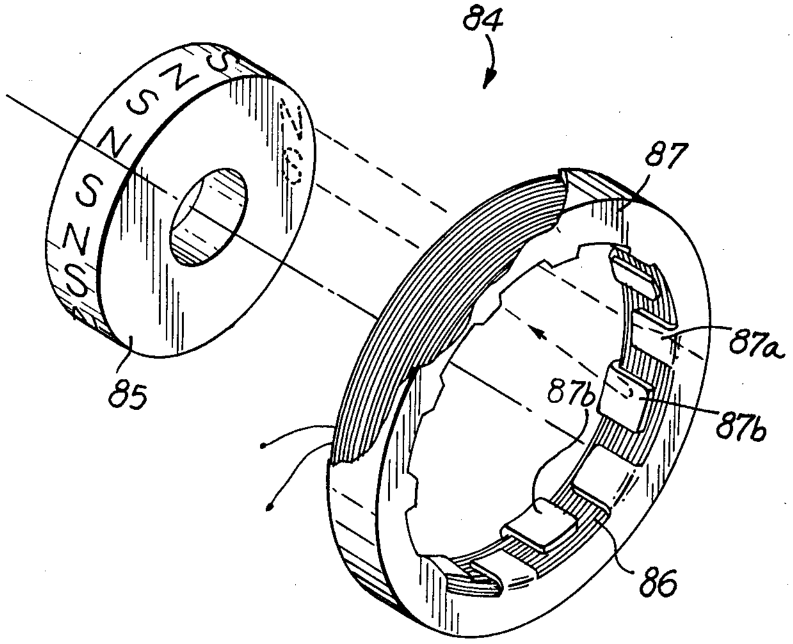
FIG. 12 is an exploded perspective view of a tacho-generator for use in connection with the printing position control circuit of the present invention.
Figures 13A, 13B, 13C, 13D, 13E:
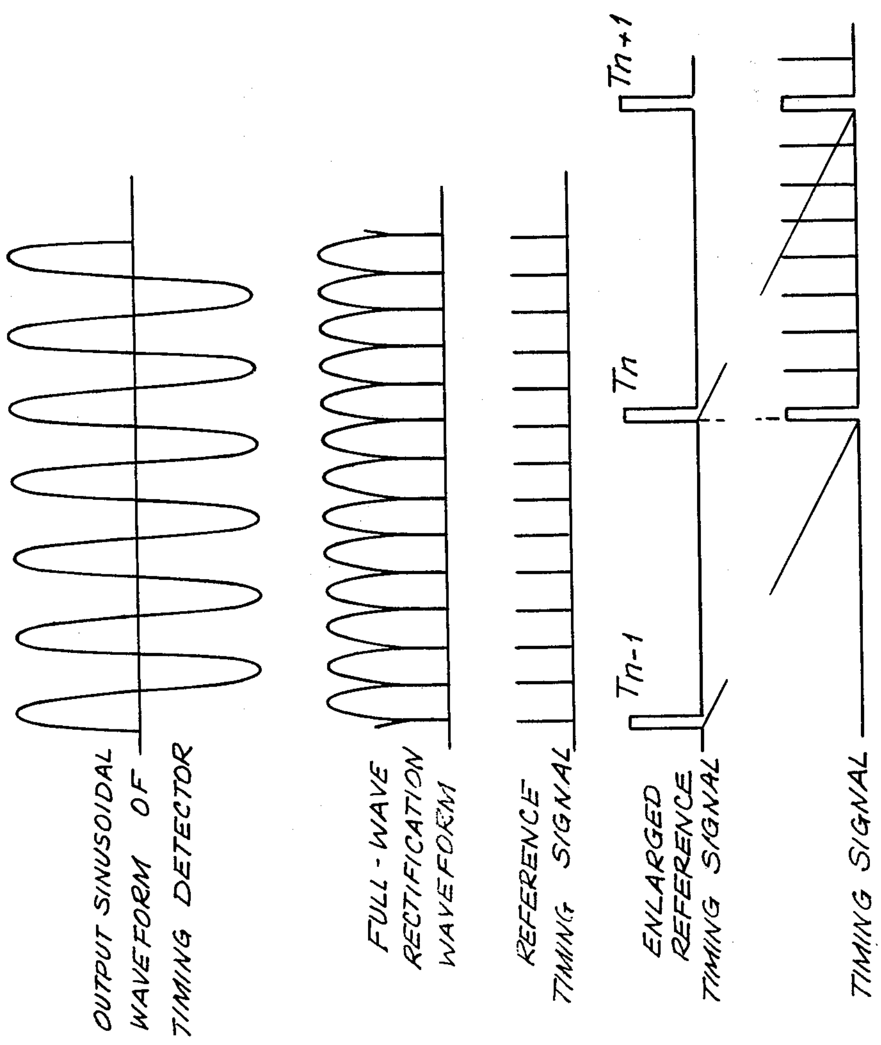
FIGS. 13A, 13B, 13C, 13D and 13E are timing charts depicting the various timing signals produced by the printing position control circuit of the present invention.

Referring to FIG. 12, a timing detecting mechanism, generally indicated as 84 is depicted. Timing detecting mechanism 84 is a tacho-generator which is built into motor 41. A permanent magnet rotor 85 includes a plurality of north and south poles alternately arranged on the periphery thereof. Rotor 85 is secured to a motor shaft (not shown) of motor 41 so that it is rotated therewith. A yoke 87 including a detection coil 86 is arranged coaxially with permanent magnet rotor 85 so that rotor 85 rotates within yoke 87. Yoke 87 has projections 87a and 87b which are alternatively arranged around the inner circumference thereof. The number of projections 87a and 87b is equal to the number of poles on rotor 85. The magnetic flux of a N pole on rotor 85 flows through a tooth 87a into the yoke and then flows out through a tooth 87b to an S pole, as indicated by the dotted lines and the arrows in FIG. 12. Thus, this flow of magnetic flux forms a closed loop around detecting coil 86. As permanent magnet rotor 85 is rotated, a voltage will be induced in detecting coil 86. The induced voltage will be substantially in the form of a sine wave as depicted in FIG. 13A. When permanent magnet rotor 85 makes one revolution, the sinusoidal voltage appears the same number of times which is equal to one half of the number of poles on rotor 85.

The output sinusoidal waveform of the timing detecting mechanism 84 depicted in FIG. 13A is subjected to full-wave rectification as depicted in FIG. 13B and subsequently to waveform shaping to obtain the reference timing signals depicted in FIG. 13C. Accordingly, whenever permanent magnet rotor 85 makes one revolution, the reference timing signals depicted in FIG. 13C are provided the number of times of which is equal to the number of poles on rotor 85. The time of the reference timing signals is measured, for example, by an LSI and is then divided into a number of parts to provide the timing signals depicted in FIG. 13E. These timing signals are used in the printing position control circuit to produce printing position signals which are applied to print head 54 for energizing same as described below.

Referring specifically to FIGS. 13D and 13E, it is assumed that the reference timing signals $T_{n-1}$ and $T_n$ which are enlarged in FIG. 13D are provided by subjecting the output waveform depicted in FIG. 13A of the timing detecting mechanism to full-wave rectification as depicted in FIG. 13B. The time from the production of signal $T_{n-1}$ to the occurrence of the signal $T_n$ is measured by an LSI and then divided into a number of parts to provide the timing signals depicted in FIG. 13E. These timing signals are produced with $T_n$ as the reference position. The number of timing signals is several times the number of printing signals which are actually used for energizing print head 54. Accordingly, these timing signals are used for print head 54 selectively, as necessary.

Figures 14A, 14B, 14C, 14D, 14E, 14F, 14G, 14H:
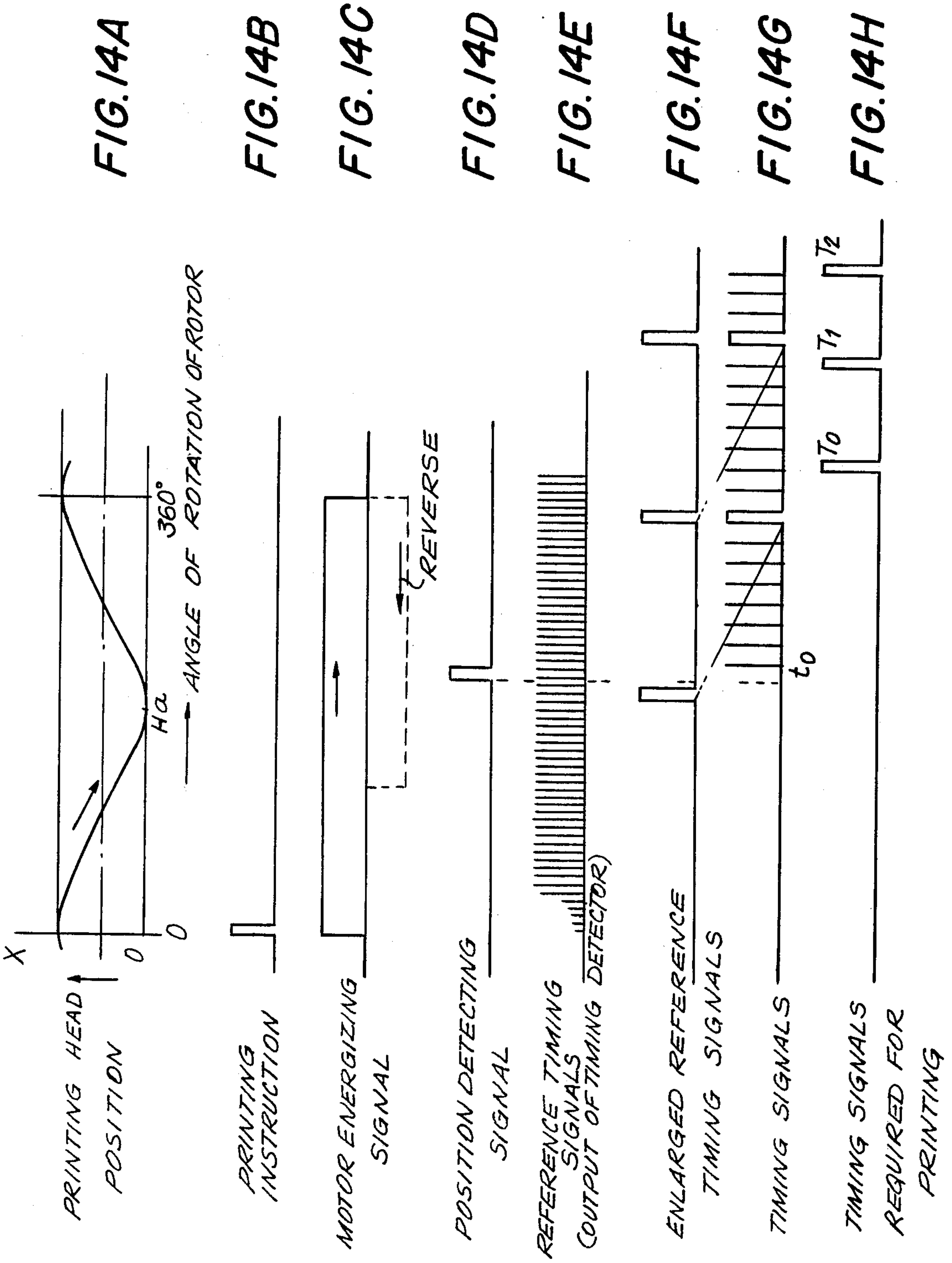
FIG. 14A is a graph depicting the print head position verses the angle of rotation of the motor rotor.
FIGS. 14B, 14C, 14D, 14E, 14F, 14G and 14H are graphs depicting various signals produced by the printing position control circuit of the present invention.

As described with reference to FIG. 10A, print head 54 in the normal printing operation moves between point X and point O along the distance L. Referring to FIG. 14A, it is assumed that in the initial state, print head 54 is positioned near point X so that the angle of rotation of crank gear 52 indicated by H is zero.

Upon application of a printing instruction signal as depicted in FIG. 14B to a printer control circuit as described below, a motor energizing signal depicted in FIG. 14C is produced so as to start the energization of motor 41. The rotation of motor 41 is transmitted to crank gear 52 in the manner described above to rotate crank gear 52 in the (+) direction of arrow D. The rotation of crank gear 52 is converted into reciprocation of print head 54 by means of transmission mechanism 53 so that print head 54 together with slide member 55 and carriage 56 is moved from point X towards point O. When the angle of rotation of disk 52 reaches the value Ha in FIG. 14A, the direction of movement of print head 54 is reversed. That is, print head 54 is at point O and moves back towards point X. Before the angle of rotation of crank gear 52 reaches value Ha, the speed of motor 41 reaches a predetermined value and therefore since the sinusoidal output waveform provided by detecting coil 86 (FIG. 12) shows a sufficiently high voltage level, the predetermined reference timing signals depicted in FIG. 14E can be obtained.

Since crank gear 52, transmission mechanism 53, slide member 55 and carriage 56 form a lost motion crank, the motion of print head 54 over a distance L is not uniform. That is, the velocity of print head 54 is not constant over distance L. The signals which are produced in the ratio of 1:1 with respect to the operation of motor 41 cannot be used as a printing signal for energizing print head 54 whose operation is not in the uniform ratio of 1:1 with respect to the operation of motor 41. Therefore, the signal produced in proportion to the operation of motor 41 is employed as the reference timing signal, and the reference timing signal is electrically divided into N timing signals, the number of which is several times the number of timing signals which are required for printing. Thus, these timing signals depicted in FIG. 14E are selectively employed in the printing position control circuit, as described below, for energizing print head 54.

In printing, while the N timing signals obtained through electrical division are being counted (the first one provided immediately after the leading edge of the position detection signal in FIG. 14D being designated by $t_0$ in FIG. 14G), the timing signals being shown as enlarged in FIG. 14F, timing signals $T_0$, $T_1$, $T_2$ . . . necessary for printing are assigned to each of the printing positions of print head 54 as described below.

In the printer of the present invention, print head 54 is a single nozzle ink jet print head. Therefore, characters or the like are formed from ink dots, and one dot line is printed by one reciprocation of print head 54. For example, in the case where a character is in a matrix of of $5\times7$ dots, a character is printed completely by seven reciprocations of print head 54. In a continuous printing operation, three dot lines are provided between adjacent character lines, and therefore characters in one line are printed by ten reciprocations of print head 54.

Upon completion of the printing operation, print head 54 is stopped at position X. When the printing operation is started again, print head 54 carries out the above-described operations starting from position X. When the printing operation is stopped for a long period or the printer power switch is turned off, it is necessary to place nozzle cap 70 over nozzle 54a on print head 54 in order to prevent the ink in nozzle 54a from being dried out. For this purpose, a signal for rotating the motor 41 in the opposite direction is applied as indicated by the broken line in the motor energizing signal in FIG. 14C. Thus, the motor is turned in the opposite direction so that crank gear 52 is rotated in the (−) direction of arrow D so that print head 54 moves the distance l so that print head 54 passes over cleaner 69 and onto nozzle cap 70. At this position, print head 54 is mechanically stopped. On the other hand, the application of a current to motor 41 is so set by an electrical circuit that it is suspended at the time instant as a reference as the signal of the timing detecting mechanism 84 is not detected after the signal of the position detecting mechanism 80 has been detected. Therefore, simultaneously when print head 54 is mechanically stopped, the rotation of motor 41 is also mechanically stopped. Accordingly, the output signal of timing detecting mechanism 84 which is provided in response to the rotation of motor 41 is not provided. This is detected by the electrical operating circuit, so that the application of current to motor 41 is suspended. When a printing operation is started under this condition, first the printing instruction is applied to the printer control circuit, described below, so that motor 41 is energized by the motor energizing signal depicted in FIG. 14C. In this case, motor 41 is rotated in the (+) direction of arrow D for printing. The rotation of motor 41 is transmitted to crank gear 52 in order to rotate crank gear 52 in the (+) direction of arrow D. As crank gear 52 is rotated in this direction, the position detection signal in FIG. 14D is provided and the printing operation is carried out again as described above.

Figure 15:
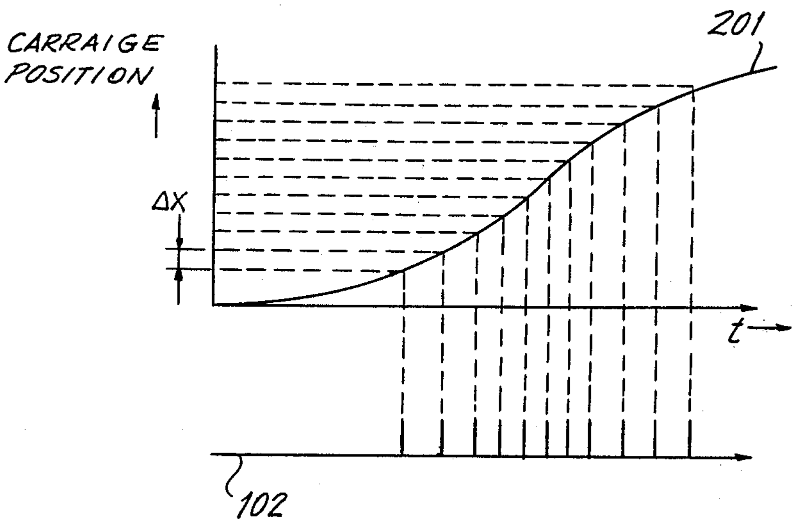
FIG. 15 is a graph depicting the relationship between the position of the printer carriage verses time.

FIG. 15 depicts the relationship between the carriage position verses time. As indicated by movement curve 201, carriage 56 makes a non-uniform motion (unconstant speed) with regularity. In order that, whenever the carriage moves a distance of ΔX, print head 54 is in a printing position and it is necessary to provide a printing position signal indicated by 102 at unequal time intervals. Thus, it is necessary to provide a printing position control circuit which provides printing signals to the print head of the printer when the print head is at each of its printing positions even though it does not have a uniform motion with respect to time.

As previously indicated, a timing detecting mechanism 84 (FIG. 12) in motor 41 acts as a tacho-generator which detects either the uniform or non-uniform motion of motor 41. It is noted that the detecting mechanism may be either a magnetic mechanism, an optical detecting mechanism or a contact detecting mechanism. The speed of detection of the parts may be relatively slow and the operation is simple. Therefore, the detecting mechanism can be readily manufactured at low cost.

As motor 41 is rotated, tacho-generator 84 produces a timing original signal 141 (FIG. 16). As crank gear 52 is rotated by motor 41, cam 52b thereon presses against contact 81 once each revolution. Position detecting mechanism 80 produces a reset original signal at the start of each printing operation. It is noted that a variety of detecting mechanisms may be employed in order to detect the start of each printing line operation. Carriage 56 will make a non-uniform motion with regularity, each time crank gear 52 is rotated in the (+) direction of arrow D. In the case when printing is carried out from right to left, the reset original signal is produced when carriage 56 is moved from position 0 to the left to a printing start position.

Referring to FIGS. 16 and 17, the construction of a printing position control circuit 500 used in the printer of the present invention will be described. A timing detector 501, such as tacho-generator 84 depicted in FIG. 12, produces a timing original signal 141 which has a voltage wave form as depicted in FIG. 16. Signal 141 is applied to a timing wave form shaping circuit 502 which outputs a timing signal 142. Timing signal 142 in FIG. 16 is applied to a timing signal period 1/N division circuit 503 so that the timing signal period is divided by a factor N, where N is an integer. As a result, N pulses are provided for each timing signal. Thus, N timing signals 143 depicted in FIG. 16 are produced. The N timing signal 143 is applied to a coincidence circuit 504 and to a timing data storage circuit or timing calculating circuit 506. Reset position detector 80 includes contact terminals 81 and 82 and operates as described above. When the switch is closed, a reset original signal (position detecting signal) depicted in FIG. 14D is applied to a reset signal waveform shaping circuit 505. In response to reset original signal 140, shaping circuit 505 produces a reset signal 139 which is applied to timing data storage circuit or timing calculating circuit 506. Reset signal 139 resets timing data storage circuit or timing calculating circuit 506 so that a decision signal 146 in FIG. 16 is applied to coincidence circuit 504. Signal 146 determines whether or not the present N timing signal should be provided as a printing position signal 145 to operate print head 54. Line 144 in FIG. 16 depicts the nonuniform printing positions of print head 54.

If it is asumed that N is 4, then the N timing signal 143 is as indicated in FIG. 16. The various printing positions of print head 54 are indicated by 144 in FIG. 16. When an N timing signal 143 is coincident with a decision signal 146 from predetermined printing position data or predetermined calculation, the printing position signal 145 is provided. The printing position signal 145 is not completely coincident with the printing position 144. However, this error can be reduced to the extent that it will cause no problems in practical use by increasing the value of N.

The timing period 1/N division circuit 503 depicted in FIG. 17 may be constructed as circuit 503*a* depicted in FIG. 18 or circuit 503*b* depicted in FIG. 19. Referring to FIG. 18, timing signal 142 is applied as a gate signal to a timing signal period measurement counter 603. A reference time oscillator 601 oscillates at a frequency f much higher than that of timing signal 142 so as to output a count signal. The count signal is applied to a frequency divider 602, where it is subjected to 1/N frequency division into a signal of f/N. With this signal, the period t seconds of the timing signal 142 is counted. Thus, the content of the timing signal period measurement counter 603 is t/(1/(f/N)), or t·f/N. This value is loaded into a preset register 605 while a programmable counter 604 counts the signal of f Hz of oscillator 601 while presetting the value. If the circuitry is so designed that one of the count loops of the programmable counter 604 outputs one pulse signal, then an N timing signal 160*b* having a period t·f/N×1/f=t/N seconds or a frequency of N·1/t will be outputted.

An alternative construction of 1/N division circuit 503 is depicted in FIG. 19 as 503*b*. The division circuit 503*b* is formed by utilizing a phased lock loop ("PLL") construction. A timing signal 142 is applied to one input of a phase detector 611 to which, in the case of an oridinary PLL, a reference frequency signal should be applied. The output of a voltage-controlled oscillator 613, i.e. N timing signal 161*b* subjected to 1/N frequency division by a 1/N frequency divider 614 is applied to the other input of phase detector 611. In phase detector 611, the difference between the two inputs is outputted as a voltage $E_0$. The voltage $E_0$ is applied to a low-pass filter 612 to obtain a DC voltage $V_D$. The DC voltage is applied to the voltage-controlled oscillator 613 whose oscillation frequency is controlled by the voltage so that the oscillator 613 is oscillated at a frequency of N times that of the timing signal 142, to produce the N timing signal 161*b*.

It is noted that circuit 506 in FIG. 17 can be either a timing data storage circuit 506*a* (FIG. 20) or a timing calculating circuit 506*b* (FIG. 21). Referring to FIG. 20, the construction of timing data storage circuit 506*a* will be described. Circuit 506*a* includes a base-N counter 701 and a read-only memory (ROM) address counter 702 which are placed in their initial state by a reset signal 170*b*. An N timing signal 170*a* is applied to base-N counter 701. When a count is provided as a result of the full count of counter 701, the carry is applied to the ROM address counter 702 where it is counted. The count value is applied to a printing position data read-only memory circuit 704 so that printing position data is read out of the read-only memory 704 and is then supplied to a selector 703. In selector 703, one of the printing position data signals is selected according to the printing position data signal thus supplied and the content of base-N counter 701 is outputted as decision signal 146.

Referring to FIG. 21, the construction of timing calculating circuit 506*b* which can be used as circuit 506 instead of timing data storage circuit 506*a* will be described. An N timing counter 801 is placed in an initial state by a reset signal 180*b*. Counter 801 carries out the counting operation with the aid of an N timing signal 180*a*. The content of the N timing counter 801 is applied to a printing position calculating circuit 802 which forms a decision signal 146 through calculation.

The movement of carriage 56 and print head 54 can be defined as follows:

$$n = \mathrm{Sin}^{-1}(x/X),$$

where X is the amount of movement of the carriage with respect to the N timing signal 180*a*, n is the number of pulses of the N timing signal 180*a*, and x is the position of the carriage.

If it is required to have printing at P places with respect to the amount of movement X, m designates a numerical value assigned to a printing position. When x=m(X/P+1), where m=1, 2, 3, . . . P, a printing position is obtained. If this is inserted in the above expression, then $$n = \mathrm{Sin}^{-1}(m(X/P+1)/X),$$

where (m=1, 2, 3, . . . P).

Thus, the decision signal required for determing the printing positions can inevitably be obtained by this formula. The printing position calculating circuit 802 carries out the calculation of this formula in order to form decision signal 146.

Coincidence circuit 504 may include an AND circuit. The N timing signals and the decision signals are applied to the AND circuit, which outputs the printing position signal. Thus, if a print is made or a dot is printed when the printing position signal in the form of a pulse is outputted, then each print is made or the dot is printed at the correct predetermined printing position. Thus, a printing position control mechanism for a printer having a carriage which makes a non-uniform motion is provided in the printer of the present invention. The circuit can be manufactured at a low cost by employing an integrated circuit or a micro-computer.

The ink jet printing mechanism utilized in the printer of the present invention which contributes greatly to the reduction of power consumption as used in the printer of the present invention will now be described. Referring to FIGS. 22 and 23, the construction of ink jet printing mechanism 182 will be described. Ink jet printing mechanism 182 includes print head 54 having an ink jet nozzle 54*a*. Print head 54 is formed by extruding a thermoplastic material. A piezoelectric element 88 is secured to print head 54 and provides the ink jetting energy for projecting ink through nozzle 54*a*. Print head 54 also includes a filter 89 which prevents dust from entering into print head 54 from ink tank 57. Ink tank 57 is filled with ink 90 and a porous member 91 which holds the ink. Print head 54 and in tank 57 can be molded as one unit or they can be molded separately and joined into a single unit. Print head 54 and ink tank 57 are mounted on carriage 56 by engaging holes 57*a* on ink tank 57 with mounting pins 56*a* (FIG. 3) on carriage 56. Thus, print head 54 and ink tank 57 can be readily replaced when the ink is consumed.

Piezoelectric element 88 is driven by the printing position signals produced by the printing control circuit to jet ink 90 through nozzle 54*a* of print head 54 to thereby print characters or the like on printing sheet 45. As the ink is consumed, the ink in porous member 91 is moved gradually towards print head 54 while air is caused to flow in ink tank 57 through an air inlet tube 57*b*. If the material and configuration of porous member 91 are so selected as to provide a negative pressure which is lower than the capillary pressure of nozzle 54*a* of print head 54 and which will not cause ink 90 to flow out of nozzle 54*a* no matter what position print head 54 is in, then the applicability of print head 54 to a portable printer can be realized. It is noted that it is preferable to make air inlet 57*b* as thin and long as possible in order to prevent against the evaporation of ink therethrough.

A variety of mechanisms for producing such a negative pressure irrespective of the position of print head 54 without using porous member 91 can be used. A method in which the wall thickness of ink tank 57 is made extremely thin so that the negative pressure is produced by the utilization of its suitable elasticity can be employed. Furthermore, a method in which, instead of ink tank 57, an ink bag made of a lamination film of polyethylene and polyvinylidene chloride is used and an elastic element is inserted in the ink bag, to provide the negative pressure can also be employed as described below.

Another embodiment of the ink jet printer is depicted in FIGS. 24, 25 and 26. In this embodiment, print head 54 is mounted on carriage 56 and ink tank 57 is removably secured to carriage 56. Print head 54 includes a filter 89 for preventing dust or the like from entering into print head 54. Print head 54 also includes a porous member 92 made of resin such as polyvinyl formal resin which has an excellent ink wetting characteristic, an air trapping chamber 93, an ink path 94 in air trapping chamber 93, a coupling member 95 made of a stainless steel hollow needle, and an ink tank 96 having a rubber plug 97 through which hollow needle 95 extends. A bubble detecting mechanism defined by electrodes 99 and 100 which extend into a narrow conduit or passageway in 98 in ink tank 96. Ink tank 96 also includes a porous member 101 which is made of the same material as porous member 92 and an elongated air inlet 102. Under normal operating conditions, an ink supply is provided from porous member 101 to print head 54.

The operation of the ink jet printer depicted in FIGS. 24 through 26 will now be described. Piezoelectric element 88 is driven by the printing position control circuit to jet ink 103 through nozzle 54*a* of print head 54 to print characters or the like on printing sheet 45. As the ink is consumed, the ink in porous member 101 is gradually moved towards print head 54 while the air is caused to flow into ink tank 96 through air inlet 102. Normally, the printing operation is carried out as described. However, if bubbles are formed in porous member 101 when the ink is being used up, then the bubble may flow towards print head 54. If the bubbles reach pipe 98, then the resistance between electrodes 99 and 100 will be increased to infinity since the ink will not provide a connection therebetween. If this variation in resistance is detected and the printing operation stopped, then the flow of bubbles into print head 54 which would interrupt the operation thereof can be prevented.

In this case, it is desirable that thin pipe 98 is a thin, round pipe having a smooth inner wall which is made of a hydrophobic material such a polyethylene. If such a thin pipe is employed, a bubble 104 whose diameter is at least as large as the inside diameter of thin pipe 98 becomes cylindrical in thin pipe 98 as depicted in FIG. 26. As a result, a space in which no ink is provided is formed between electodes 99 and 100, thus increasing the resistance between the electrodes to infinity. The space is positively stablized by the capillary force which is provided by the ink and thin pipe 98, that is, the space is scarsely affected by gravity. Accordingly, bubble 104 can be positively detected no matter what position the printer is in.

Bubbles which are formed closer to print head 54 than electrode 100, which are too small to be detected in thin pipe 98, or which are present at the end of coupling member 95 when ink tank 96 is replaced after the ink in ink tank 96 has been used up or when coupling member 95 is inserted into rubber plug 97, are collected in the air trapping chamber 93 by being blocked by porous member 92. Since an ink path 94 is provided in the wall of air trapping chamber 93, no bubble will reach print head 54 through porous member 92 so that the supply of ink will not be interrupted which otherwise would make it impossible to carry out the printing operation, no matter what position the printer is in. Ink path 94 is provided in the form of many grooves in the inner wall of air trapping chamber 93 so that the ink is introduced from coupling member 95 into porous member 92 by capillary action. Alternatively, the inner wall of air trapping chamber 93 may be subjected to surface treatment to improve its ink wetting characteristic. Also, a bundle of fibers may be arranged in air trapping chamber 93. For further information, reference should be made to my copending U.S. patent application entitled INK SUPPLY SYSTEM FOR INK JET PRINTERS filed on June 4, 1981.

If the material and configuration of porous member 101 are so selected as to provide a negative pressure which is lower than the capillary pressure of nozzle 54*a* of print head 54 and which will not cause ink 103 to flow out of nozzle 54*a* regardless of the position of the printer, then the applicability of the ink jet printing mechanism described herein for use in a portable printer is increased. It is noted that it is preferable to make air inlet 102 as thin and long as possible in order to prevent the ink from evaporating.

Figure 27:
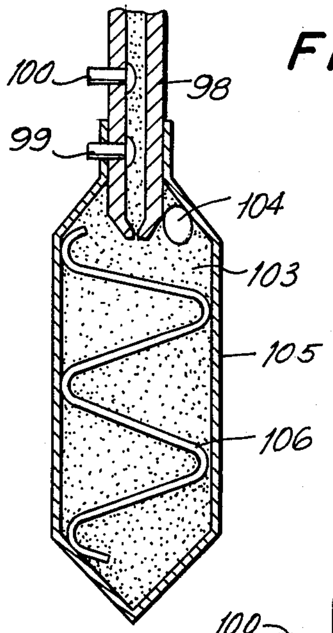
FIGS. 27 and 28 are alternative sectional schematic views of an ink bag and bubble detector for use in the printer of the present invention.

As aforenoted, other constructions for generating a negative pressure irrespective of the position of the printer without using porous member 101 are possible. FIG. 27 depicts another embodiment of the invention in which the technical concept of the invention is applied to an ink tank in which the negative pressure is produced by the elastic force of an elastic element. An ink bag 105 is made of a lamination film of polyethylene and polyvinylidene chloride depicted as having a bubble 104 therein. Ink bag 105 includes an elastic member 106 which applies an outward force to ink bag 105, a thin pipe 98 in which is situated electrodes 99 and 100 and ink 103. The embodiment in FIG. 27 is different than the embodiment in FIG. 25 in that the negative pressure is produced by the elastic force of elastic member 106 and the bubble 104 is sealed in ink bag 105 in advance in order to detect the fact that the ink is used up. Therefore, one end portion of thin pipe 98 protrudes into ink bag 105 or a bubble-flow-in preventing mechanism is provided so that bubble 104 cannot flow into pipe 98 until the ink is used up.

Figure 28:
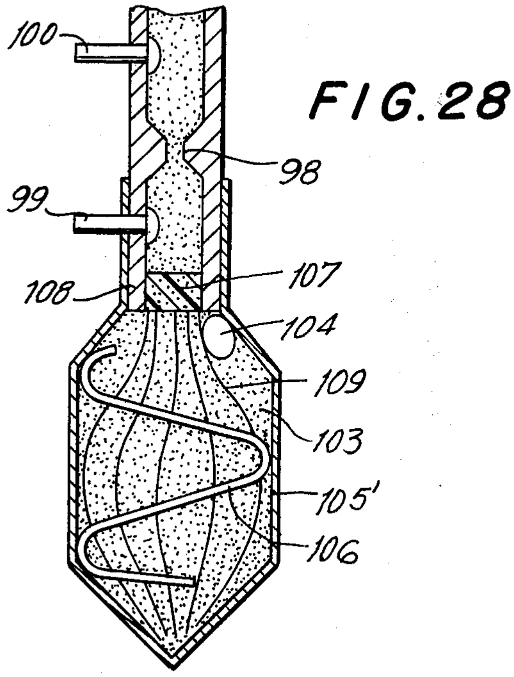

One example of a bubble-flow-in preventing mechanism is depicted in FIG. 28. The bubble-flow-in preventing mechanism can be obtained by modifying the embodiment in FIG. 27 as follows. A porous member 107 excellent in ink wetting properties is provided in the ink inlet of thin pipe 98 and fibers 109 extend from the ink inlet. With this construction, it is difficult for a bubble 104 to pass through porous member 107 and bubble 104 is allowed to flow into thin pipe 98 only when ink in ink bag 105' has been consumed. Fibers 109 serve to prevent the occurrence of the problem where the volume of the bubble is large and the ink bag is held in the orientation depicted in FIG. 28 wherein the bubble would cover porous member 107 and finally pass therethrough. Furthermore, fibers 109 serve as means for causing, prior to bubble 104, ink 103 to flow into thin pipe 98 as long as ink 103 is available in ink bag 105'. The same effect can be obtained by forming grooves having capillary action in the inner wall of the ink bag which extend towards porous member 107. Furthermore, a method may be employed in which the ink wetting characteristic of the inner wall of the ink bag is improved, so that ink 103 reaches porous member 107 irrespective of the position of the printer.

The embodiments depicted in FIGS. 27 and 28 are advantageous in that, even if a bubble is created in the print head, the bubble together with the ink can be removed by squeezing the ink bag from the outside, which cannot be done with the embodiment depicted in FIG. 25. Electrodes 99 and 100 can be coupled to a bubble detecting circuit (not shown). It would be desirable that electrodes 99 and 100 contact the bubble detecting circuit when the ink tank is secured on the carriage.

If a temperature characteristic compensating circuit is added to the bubble detecting circuit, then the instability of the bubble detecting circuit due to temperature variation can be eliminated. Furthermore, if, in addition to electrodes 99 and 100, another electrode is provided so that a bridge circuit is constituted by the three electrodes, then the detection can be carried out more stably. However, even the method described with reference to FIG. 25 is superior to the conventional bubble detecting method because the variation is resistance due to the presence and absence of the bubble is large enough to cover the temperature characteristic.

If, in detecting the resistance, direct current is applied, then the ink is subjected to electrolysis. Therefore, detection of the resistance using alternating current has been described in U.S. Pat. No. 4,202,267. However, the circuitry disclosed therein is intricate. Therefore, in the embodiments of the present invention, extremely short DC pulses (several micro seconds to several mili seconds) are employed. For instance the resistance is detected in a sampling manner whenever several lines are printed, so that the detection is carried out stably without causing a negative influence such as electrolysis.

The diameter of thin pipe 98 in FIG. 26 may be set to a suitable value between 0.3 to 1 mm for example, so as not to detect a bubble which is too small in the air collecting chamber to cause any adverse effects. This will elminate the difficulties that the bubble detecting sensitivity is so high that it is necessary to frequently replace the ink tank unnecessarily. Furthermore, in order to reduce the flow resistance in the thin pipe, a thin pipe, the diameter of which is reduced only at a position between electrodes 99 and 100 as depicted in FIG. 28, may be utilized.

The small printer according to the present invention has been described with reference to several specific embodiments and constructions thereof in detail. Now, the energy consumption thereof will be described. First, for the following calculation, the following variables are assumed as conditions for calculating the energy consumption:

Printing carriage movement distance L=3 cm.

Printing mechanism weight W=3 g.

Printing mechanism movement period N=6 Hz.

The speed of print head 54 of the printing mechanism is varied in the range of from 0 cm/s to 56.5 cm/s, and the energy of motion in one reciprocation of printing mechanism is represented as follows:

$$E_1 = \tfrac{1}{2} mV^2 \times 2$$

$$= \frac{3\ \text{g}}{980\ \text{cm/s}^2} \times (56.5\ \text{cm/s})^2 \times 2 = 9.8\ \text{(g-cm)}$$

The energy loss of slide member 55 with respect to shaft 62 in one reciprocation of the carriage is indicated as:

$$E_2 = \mu\, W L \times 2 \qquad (\mu = \text{coefficient of friction})$$

$$= 0.3 \times 3\ \text{g} \times 3\ \text{cm} \times 2 = 5.4\ \text{(g-cm)}.$$

As printing sheet 45 is fed a distance of 0.03 cm by a feeding force of 40 g in one reciprocation of print head 54, the energy consumed in feeding the printing sheet is:

$$E_3 = 40\ \text{g} \times 0.03\ \text{cm} = 1.2\ \text{(g-cm)}$$

It is necessary to add energy loss due to the sheet feeding roller shaft 48a and the bearings to that value $E_3$. Thus, the resultant value is about 2.5 (g-cm).

The above-described energies are consumed in one reciprocation of the printing mechanism and the sum is about 18 (g-cm). In the case where one line is printed by ten reciprocations of the printing mechanism, the energy is about 18 mJ and if the transmission efficiency is 30% for example, then the energy is 60 mJ. Furthermore, if it is assumed that the efficiency of motor 41 is 30%, then the energy is about 200 mJ. If the energy which the print head 54 consumes for energizing same is disregarded because the ink jet head is employed as the print head as described herein, then the energy consumed by the small printer of the invention will be 200 mJ. This value is much smaller than that in conventional battery-operated small printers. Thus, the object of the present invention can be achieved by utilizing the small printer described herein in a portable electronic calculator.

The printer of the present invention provides a small printer especially adapted for use in hand-held or portable electronic calculators. The small printer utilizes a crank mechanism to operate the printing mechanism and the other mechanisms in the printer are excellent in efficiency so that a small printer which can operate for a long period of time on a pair of magnanese dry cells UM-III, UM-IV or UM-V. That is, the energy consumed by the printer of the present invention is very small. Thus, according to the present invention, a small printer simple in construction, small in size, low in noise and low in manufacturing costs and which operates without fail can be provided.

It is noted finally that not only a rolled printing sheet but also a flat printing sheet such a memorandum sheet may be employed as the printing medium in the small printer. Accordingly, it is unnecessary to load the rolled sheet in the small printer or provide a housing for the rolled sheet. Thus, if the small printer is employed, a pocketable and portable electronic calculator with a printer which is sufficiently small in size for practical use can be provided.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printer for printing characters on a printing medium comprising a frame, carriage means slidably mounted on said frame for reciprocal lateral displacement across said printing medium, a first end of said carriage means being slidably mounted on said frame, said carriage means including a second end pivotally coupled to said frame, printing means carried on said carriage means for selectively printing characters at predetermined positions along lines of said printing medium, motor means for providing a rotary motion, coupling means coupling said motor means to said carriage means for selectively converting the rotary motion of said motor means into non-uniform reciprocation of said carriage means so that said printing means reciprocates through said predetermined positions, said coupling means being a crank means including a crank gear means rotatably mounted on said frame and engaged with said motor means for rotation thereby and a transmission lever means coupled intermediate said crank gear means and said carriage means for converting the rotation of said crank gear means into reciprocation of said carriage means, and printing position control circuit means for determining when said printing means is in each said predetermined position and for selectively supplying a printing signal to said printing means so that said printing means will print a character at said selected predetermined positions.

2. The printer as claimed in claim 1, wherein said transmission lever means includes two ends, a first end of said transmission lever means being pivotally coupled to the periphery of said crank gear means and said second end of said transmission lever means being pivotally coupled to said carriage means.

3. The printer as claimed in claim 2, wherein said transmission lever means includes first and second lever means each having two ends, a second end of said first lever means being pivotally coupled to a first end of said second lever means, the first end of said first lever means being pivotally coupled to said carriage means, the second end of said second lever means being pivotally coupled to the periphery of said crank gear means.

4. The printer as claimed in claim 3, wherein said transmission lever means further comprises a lock lever means coupled intermediate said first and second lever means for preventing said first and second lever means from substantially pivoting where they are coupled together and thereby holding said first and second lever means in an extended position when said crank gear means is rotated in a first direction.

5. A printer for printing characters on a printing medium comprising a frame, carriage means slidably mounted on said frame for reciprocal lateral displacement across said printing medium, printing means carried on said carrier means for selectively printing characters at predetermined positions along lines of said printing medium, said printing means including an ink jet print head mounted on said carriage means for lateral displacement across said printing medium, said ink jet print head having a nozzle facing said printing medium through which ink is projected onto said printing medium, motor means for providing a rotary motion, coupling means coupling said motor means to said carriage means for selectively converting the rotary motion of said motor means into non-uniform reciprocation of said carriage means so that said printing means reciprocates through said predetermined positions, and printing position control circuit means for determining when said printing means is in each said predetermined position, said printing position control circuit means selectively supplying said printing signal to said print head so that ink will be projected through said nozzle only at said predetermined positions.

6. The printer as claimed in claim 5, wherein said frame includes an ink jet nozzle cap means mounted thereon, said transmission lever means moving said nozzle into engagement with said cap means when said crank gear means is rotated in a second direction.

7. The printer as claimed in claim 4, wherein said printing means includes an ink jet print head mounted on said first end of said carriage means for lateral displacement across said printing medium, said ink jet print head having a nozzle facing said printing medium through which ink is projected onto said printing medium, said printing position control circuit means selectively supplying said printing signal to said print head so that ink will be projected through said nozzle only at said predetermined positions.

8. The printer as claimed in claim 7, wherein said frame includes an ink jet nozzle cap means mounted thereon, said transmission lever means moving said nozzle into engagement with said cap means when said crank gear means is rotated in a second direction.

9. The printer as claimed in claim 8, wherein said lock lever means permits said first and second lever means to pivot where they are coupled together and thereby fold together so that said nozzle can be moved into engagement with said cap means.

10. The printer as claimed in claim 6 or 8, wherein said cap means includes nozzle cleaning means, said nozzle cleaning means cleaning said nozzle each time said nozzle is brought into engagement with said cap means.

11. The printer as claimed in claim 10, wherein said cleaning means is constructed from a porous material.

12. The printer as claimed in claim 10, wherein said cap means is constructed from rubber.

13. The printer as claimed in claim 9, wherein said transmission lever means includes spring means coupled intermediate said first and second lever means for biasing said first and second lever means in their extended position when said crank gear means is rotated in said first direction, said spring means further biasing said first and second lever means in their folded position when said crank gear means is rotated in said second direction.

14. The printer as claimed in claim 7, wherein said second end of said carriage means is wider than said first end of said carriage means.

15. The printer as claimed in claim 14, wherein said second end of said carriage means includes a first pin mounted thereon, said frame having an arcuate slot formed therein in which said first pin extends.

16. The printer as claimed in claim 15, wherein said frame includes an elongated shaft mounted thereon which extends laterally across said printing medium, said first end of said carriage means carrying said print head being slidably mounted on said elongated shaft, said transmission lever means reciprocating said first end of said carriage means carrying said print head along said shaft while said first pin on said carriage means slides along said slot in said frame.

17. The printer as claimed in claim 5, further comprising sheet feeding means for selectively advancing said printing medium past said printing means.

18. The printer as claimed in claim 17, wherein said sheet feeding means includes a sheet roller means rotatably mounted on said frame which presses against said printing medium for holding said printing medium and for advancing said printing medium past said printing means.

19. The printer as claimed in claim 7, further comprising sheet feeding means for selectively advancing said printing medium past said printing means.

20. The printer as claimed in claim 19, wherein said sheet feeding means includes a sheet roller means rotatably mounted on said frame which presses against said printing medium for holding said printing medium and for advancing said printing medium past said printing means.

21. The printer as claimed in claim 20, wherein said sheet feeding means includes a third lever means reciprocatingly mounted on said frame, said third lever means being coupled to said crank gear means for reciprocation thereby, a first end of said third lever means having pawl means, said sheet roller means having ratchet means secured thereto in engagement with said pawl means, said crank gear means reciprocating said third lever means so that said pawl means advances said ratchet means thereby rotating said sheet roller means whereby said printing medium is advanced.

22. The printer as claimed in claim 21, wherein said crank gear means includes first cam means and said third lever means includes cam follower means in engagement with said first cam means so that when said crank gear means is rotated, said third lever means will be reciprocated.

23. The printer as claimed in claim 22, wherein said sheet feeding means further includes a sheet pressing roller means for biasing said printing medium against said sheet roller means.

24. The printer as claimed in claim 23, wherein said sheet pressing rolling means includes release lever means for releasing the biasing of said sheet pressing roller means so that said printing medium can be manually advanced.

25. The printer as claimed in claim 24, wherein said sheet feeding roller means includes an elongated roller shaft having at least two rollers spaced thereon in engagement with said printing medium.

26. The printer as claimed in claim 25, wherein a first said roller is wider than the other said roller to insure proper advancement of said printing medium through said printer.

27. The printer as claimed in claim 25, wherein said elongated roller shaft is tapered, said roller shaft having a rubber roller therearound which engages said printing medium.

28. The printer as claimed in claim 21, wherein said frame includes an upper frame section and a lower frame section secured together at respective ends thereof to define a cantilever structure.

29. The printer as claimed in claim 28, wherein said first and second frame sections are spaced apart to define an opening therebetween, said printing medium being positioned in said opening and advanced therebetween so that said printing means can print thereon.

30. The printer as claimed in claim 29, wherein said printing medium is a flat printing sheet.

31. The printer as claimed in claim 29, wherein said printing medium is a rolled printing tape.

32. The printer as claimed in claim 5, 6, 7 or 13, wherein said print head includes a piezoelectric means mounted thereon for energizing said print head in response to said printing signal.

33. The printer as claimed in claim 32, wherein said printing means further includes ink tank means removably secured to said carriage means for holding a supply of ink and conduit means connecting said ink storage means to said print head so that ink can be supplied to said nozzle from said ink storage means through said conduit means.

34. The printer as claimed in claim 33, wherein said conduit means includes filter means for filtering impurities out of said ink as it flows toward said nozzle.

35. The printer as claimed in claim 34, wherein said printing means further includes an air trapping means disposed along said path of flow of said ink through said conduit means for preventing air bubbles in said ink from flowing into said nozzle.

36. The printer as claimed in claim 35, wherein said conduit means further includes bubble detecting means for detecting the presence of a bubble in said conduit means.

37. The printer as claimed in claim 36, wherein said air trapping means includes first porous means for preventing air bubbles in said ink from flowing into said nozzle and fluid passage means through which ink can flow through said air trapping means into said nozzle.

38. The printer as claimed in claim 37, wherein said first porous means is formed from a material having an excellent wetting property with said ink.

39. The printer as claimed in claim 38, wherein said material is a polyvinyl formal resin.

40. The printer as claimed in claim 36, wherein said bubble detecting means includes at least two spaced electrodes in said conduit means positioned for contact by said ink in said conduit means.

41. The printer as claimed in claim 40, wherein said conduit means includes a capillary means, said at least two electrodes being positioned with at least a portion of said capillary means therebetween.

42. The printer as claimed in claim 41, wherein said capillary means includes an inner wall formed from a hydrophobic material.

43. The printer as claimed in claim 42, wherein said hydrophobic material is polyethylene.

44. The printer as claimed in claim 41, wherein said print head includes hollow needle means for connecting said ink tank means to said print head.

45. The printer as claimed in claim 44, wherein said ink tank means is disposable.

46. The printer as claimed in claim 33, wherein said ink tank means and said print head are integrally formed and are disposable.

47. The printer as claimed in claim 33, wherein said print head is molded from a thermoplastic.

48. The printer as claimed in claim 33, wherein said ink tank means includes a flexible wall defining an ink bag in which said ink is stored, said ink tank means including elastic means in said ink bag for imparting an outward force on said flexible wall.

49. The printer as claimed in claim 48, wherein said conduit means is coupled to an exit opening in said ink bag and includes bubble flow preventing means positioned therein in the region of said exit opening.

50. The printer as claimed in claim 49, wherein said bubble flow preventing means includes second porous means having an excellent wetting property with said ink.

51. The printer as claimed in claim 50, wherein said bubble flow preventing means further includes fibers which extend into said ink bag from said second porous means.

52. The printer as claimed in claim 32, further comprising sheet feeding means for selectively advancing said printing medium past said printing means.

53. The printer as claimed in claim 33, further comprising sheet feeding means for selectively advancing said printing medium past said printing means.

54. The printer as claimed in claim 1, 5 or 7, wherein said motor means includes tacho-generator means for producing timing signals, said printing position control circuit means receiving said timing signals and in response thereto producing said printing signals.

55. The printer as claimed in claim 54, wherein said printing position control circuit means includes division circuit means for dividing said timing signals by an integer N and producing a plurality of N timing signals, memory circuit means for producing decision signals representative of the predetermined printing positions and coincidence circuit means for receiving said decision signals and said N timing signals and for producing said printing signals in response thereto.

56. The printer as claimed in claim 55, wherein said division circuit means includes oscillator means for producing count signals and frequency division circuit means for receiving said count signals and said timing signals and for producing said N timing signals in response thereto.

57. The printer as claimed in claim 56, wherein said division circuit means is formed by a phased-lock loop circuit.

58. The printer as claimed in claim 1 or 7, wherein said motor means includes tacho-generator means for producing timing signals, said printing position control circuit means receiving said timing signals and in response thereto producing said printing signals.

59. The printer as claimed in claim 58, wherein said printing position control circuit means includes division circuit means for dividing said timing signals by an integer N and producing a plurality of N timing signals, memory circuit means for producing decision signals representative of the predetermined printing positions and coincidence circuit means for receiving said decision signals and said N timing signals and for producing said printing signals in response thereto.

60. The printer as claimed in claim 59, further comprising switch means mounted on said frame, said crank gear means including actuation means for closing said switch means when said printing means is in a start position, said switch means producing a reset signal when closed, said reset signal being supplied to said memory circuit means to reset same.

61. The printer as claimed in claim 60, wherein said actuation means includes second cam means mounted on said crank gear means and said switch means includes a biased contact means which is pressed by said second cam means when said printing means is in a start position for closing said switch means.

62. The printer as claimed in claim 60, wherein said memory circuit means is a timing data storage circuit having a read-only memory which stores data representative of said predetermined printing positions.

63. The printer as claimed in claim 60, wherein said memory circuit means is a timing calculating circuit means having a printing position calculating circuit which stores a formula from which said predetermined printing positions can be calculated.

64. A printer for printing characters on a recording medium defining a printing area on which printing occurs comprising a frame, carriage means slidably mounted on said frame for reciprocal lateral displacement across said printing medium, printing means carried on said carriage means for selectively printing characters at predetermined positions in said printing area along lines of said printing medium, drive means for reciprocating said carriage means with non-uniform speed in said printing area of said recording medium so that said printing means reciprocates through said predetermined positions with non-uniform speed and printing position control circuit means for determining when said printing means is in each said predetermined position and for selectively supplying a printing signal to said printing means so that said printing means will print a character at said selected predetermined positions, said printing position control circuit means including generator means for producing reference timing signals in response to the motion of said drive means and division circuit means for receiving said reference timing signals and dividing said reference timing signals by an integer N to produce N timing signals, printing position memory means for producing decision signals representative of the predetermined printing positions of said printing means, coincidence circuit means for receiving said N timing signals and said decision signals and for producing printing signals in response thereto, said printing signals being applied to said printing means so that said printing means will only print in said predetermined positions.

65. The printer as claimed in claim 64, wherein said printing position memory means is a timing calculating circuit means including a printing position calculating circuit which is programmed with a formula representative of said predetermined printing positions.

66. A printer for printing characters on a printing medium comprising a frame, carriage means slidably mounted on said frame for reciprocal lateral displacement across said printing medium, printing means carried on said carriage means for selectively printing characters at predetermined positions along lines of said printing medium, motor means for providing a rotary motion, coupling means coupling said motor means to said carriage means for selectively converting the rotary motion of said motor means into non-uniform reciprocation of said carriage means so that said printing means reciprocates through said predetermined positions, printing position control circuit means for determining when said printing means is in each said predetermined position and for selectively supplying a printing signal to said printing means so that said printing means will print a character at selected predetermined positions, said coupling means including crank means having crank gear means rotatably mounted on said frame and engaged with said motor means for rotation thereby and transmission lever means, said transmission lever means having first and second ends, said first end of said transmission lever means being pivotally coupled to said crank gear means and said second end of said transmission lever means being pivotally coupled to said carriage means for converting the rotation of said crank gear means into reciprocation of said carriage means.

* * * * *